US007765175B2

(12) United States Patent
Crandall et al.

(10) Patent No.: US 7,765,175 B2
(45) Date of Patent: Jul. 27, 2010

(54) OPTIMIZATION EXPERT SYSTEM

(75) Inventors: John G. Crandall, New Kensington, PA (US); Glen F. Chatfield, Bradfordwoods, PA (US)

(73) Assignee: OPTIMUM Power Technology, L.P., Bridgeville, PA (US)

(*) Notice: Subject to any disclaimer, the term of this patent is extended or adjusted under 35 U.S.C. 154(b) by 0 days.

(21) Appl. No.: 11/506,585

(22) Filed: Aug. 18, 2006

(65) Prior Publication Data
US 2007/0094229 A1 Apr. 26, 2007

Related U.S. Application Data

(62) Division of application No. 10/666,293, filed on Sep. 18, 2003, now abandoned.

(51) Int. Cl.
*G06N 5/00* (2006.01)
(52) U.S. Cl. ............................ 706/45; 706/12; 706/19; 706/46; 706/47
(58) Field of Classification Search ................ 706/12, 706/13, 19, 45–47, 50, 60, 61; 703/1, 2, 703/6, 13, 23; 700/9, 17, 28–34, 52, 54, 700/67, 103, 104
See application file for complete search history.

(56) References Cited

U.S. PATENT DOCUMENTS

| 4,480,480 | A |   | 11/1984 | Scott et al. |
|---|---|---|---|---|
| 4,949,278 | A |   | 8/1990 | Davies et al. |
| 5,274,714 | A |   | 12/1993 | Hutcheson et al. |
| 5,394,322 | A |   | 2/1995 | Hansen |
| 5,428,712 | A |   | 6/1995 | Elad et al. |
| 5,465,308 | A |   | 11/1995 | Hutcheson et al. |
| 5,471,408 | A | * | 11/1995 | Takamoto et al. ............ 703/2 |
| 5,682,309 | A |   | 10/1997 | Bartusiak et al. |
| 5,825,660 | A |   | 10/1998 | Cagan et al. |
| 5,978,083 | A |   | 11/1999 | Muller |
| 6,018,317 | A |   | 1/2000 | Dogan et al. |
| 6,018,732 | A |   | 1/2000 | Bertrand et al. |
| 6,047,221 | A |   | 4/2000 | Piche et al. |
| 6,064,971 | A |   | 5/2000 | Hartnett |

(Continued)

FOREIGN PATENT DOCUMENTS

EP 1113457 * 5/2007

(Continued)

OTHER PUBLICATIONS

Gill et al., Practical Optimization, 1981, Academic Press, ISBN 0-12-283950-1.

(Continued)

*Primary Examiner*—Donald Sparks
*Assistant Examiner*—Omar F Fernandez Rivas
(74) *Attorney, Agent, or Firm*—Richard W. James

(57) ABSTRACT

An expert system having a data storage device and a processor. The data storage device stores models having attributes, objectives having rules for evaluating the models, and strategies having rules for modifying the attributes. The processor evaluates a selected model in accordance with a selected objective and having the variable attribute set in accordance with a selected strategy to determine a characteristic value associated with the selected model and the variable attribute setting. The processor also stores information associated with improved results in the data storage device.

37 Claims, 27 Drawing Sheets

U.S. PATENT DOCUMENTS

| | | | |
|---|---|---|---|
| 6,067,409 A | 5/2000 | Scepanovic et al. | |
| 6,086,617 A * | 7/2000 | Waldon et al. | 703/2 |
| 6,110,214 A | 8/2000 | Klimasauskas | |
| 6,154,735 A | 11/2000 | Crone | |
| 6,208,295 B1 | 3/2001 | Dogan et al. | |
| 6,246,972 B1 | 6/2001 | Klimasauskas | |
| 6,252,398 B1 | 6/2001 | Goldfine et al. | |
| 6,381,564 B1 * | 4/2002 | Davis et al. | 703/22 |
| 6,583,797 B1 | 6/2003 | Roth | |
| 6,594,575 B2 | 7/2003 | Pflugl et al. | |
| 6,708,155 B1 * | 3/2004 | Honarvar et al. | 705/7 |
| 6,751,602 B2 | 6/2004 | Kotoulas et al. | |
| 6,804,611 B2 | 10/2004 | Mayo et al. | |
| 6,850,806 B2 | 2/2005 | Yutkowitz | |
| 6,868,367 B2 | 3/2005 | Yemini et al. | |
| 6,873,256 B2 | 3/2005 | Lemelson et al. | |
| 6,873,877 B1 | 3/2005 | Tobias et al. | |
| 6,877,297 B2 | 4/2005 | Armington et al. | |
| 6,907,545 B2 | 6/2005 | Ramadei et al. | |
| 6,944,605 B2 | 9/2005 | Bailie | |
| 6,959,263 B2 | 10/2005 | Wilson et al. | |
| 6,961,636 B1 * | 11/2005 | Chong et al. | 700/121 |
| 6,968,328 B1 | 11/2005 | Kintzer et al. | |
| 6,970,858 B1 | 11/2005 | Nichols et al. | |
| 6,978,244 B2 | 12/2005 | Rovinelli et al. | |
| 6,981,019 B1 | 12/2005 | Boies et al. | |
| 7,107,191 B2 * | 9/2006 | Stewart et al. | 703/1 |
| 7,243,056 B2 * | 7/2007 | Olhofer et al. | 703/7 |
| 7,260,516 B2 * | 8/2007 | Chatfield et al. | 703/14 |
| 7,260,551 B2 * | 8/2007 | Phillips | 705/10 |
| 2001/0039480 A1 | 11/2001 | Mayo et al. | |
| 2001/0051855 A1 | 12/2001 | Wang et al. | |
| 2003/0000500 A1 | 1/2003 | Chatfield | |
| 2003/0018399 A1 | 1/2003 | Havener et al. | |
| 2003/0033105 A1 | 2/2003 | Yutkowitz | |
| 2003/0036868 A1 | 2/2003 | Yutkowitz | |
| 2003/0046049 A1 * | 3/2003 | Chatfield et al. | 703/6 |
| 2003/0055614 A1 | 3/2003 | Pelikan et al. | |
| 2003/0079188 A1 * | 4/2003 | McConaghy et al. | 716/2 |
| 2003/0093763 A1 * | 5/2003 | McConaghy | 716/2 |
| 2004/0030664 A1 | 2/2004 | Kotoulas et al. | |
| 2004/0098358 A1 * | 5/2004 | Roediger | 706/46 |
| 2004/0193385 A1 | 9/2004 | Yutkowitz | |
| 2005/0197875 A1 | 9/2005 | Kauffman | |

FOREIGN PATENT DOCUMENTS

| | | |
|---|---|---|
| EP | 1113457 B1 | 5/2007 |
| JP | H06-195402 A | 7/1994 |
| JP | H11-120000 A | 4/1999 |
| WO | 98/37465 A1 | 8/1998 |
| WO | WO 98/37465 * | 8/1998 |
| WO | 01/55939 A2 | 8/2001 |
| WO | WO 01/55939 A2 * | 8/2001 |

OTHER PUBLICATIONS

Linkens et al, "Design and Implementation of a Knowledge-Based Framework for the Modeling and Simulation of Hybrid Systems", IEE International Conference on Control, Sep. 1996.

Linkens et al., "Design and Implementation of a Hybrid Modeling and Simulation Strategy for Integrated Control", IEEE Proc. Int. Symp. Comp.-Aid. Ctrl. Sys. Design, Sep. 1996.

Wu et al., "Experiences Parallelizing a Commercial Network Simulator", IEEE Proceedings of the Simulation Conference, 2001.

* cited by examiner

Design Optimization

OPTIMIZATION EXPERT SYSTEM

CROSS-REFERENCE TO RELATED APPLICATIONS

This is a divisional application filed from U.S. patent application Ser. No. 10/666,293, filed Sep. 18, 2003 now abandoned, which is incorporated herein by reference.

STATEMENT REGARDING FEDERALLY SPONSORED RESEARCH

Not Applicable

FIELD OF THE INVENTION

The present invention is directed to one or more expert systems and, in particular, to expert systems for use in connection with simulation or optimization systems.

BACKGROUND OF THE INVENTION

Simulation systems exist to simulate devices or processes. For example, a simulator has been created to simulate the performance of an engine built to a particular specification. To specify a complete engine from intakes to exhaust, however, may require the specification of more than a thousand attributes. For example, the definition of valves in each cylinder typically requires the specification of the number of intake and exhaust valves, the diameter of each valve, cam properties including the lift of each valve, the timing and speed of opening and closing of each valve, etc. Of course there are many other complex parts of a typical modern engine and so it may be seen that definition of a complete operational engine is a complex undertaking, but one that has been necessary to perform a comprehensive simulation. Thus, there is a need for an expert system that will specify all of the attributes of a complete model given only a limited specification provided by a user. There is also a need for an expert system that preserves models for future reuse.

Optimization systems also exist to simulate multiple models to find one or more models that best achieve one or more goals. For example, an optimization system has been created that causes one or more attributes of an engine to be varied, simulations to be performed on each engine variation, and comparison made between the performance of each simulation to determine one or more optimum engine configurations. The optimization strategy, however, is typically complex, requiring the definition of many attributes that affect one another in subtle ways. For example, a design space may be selected that defines borders to the extent to which the optimization system will vary values of attributes during an optimization. Design tolerance attributes may be selected to determine the proximity of values within the design space to be considered. Random selection may furthermore be utilized to choose fewer than all tolerance points in the design space for simulation. Thus, the size of the design space, the proximity of values to be considered within the design space and the portion of the values within the design space to be selected randomly for simulation are intertwined in a way that is complex, particularly to a novice designer. Thus, there is a need for an expert system that will specify all of the attributes of a complete optimization strategy given only a limited specification provided by a user. There is also a need for an expert system that preserves proven strategies for future reuse.

It is also desirable to create a strategy that is aimed at optimizing a particular aspect of a model and is also applicable to that same aspect of, for example, a similar model in a different size. An example related to engines may be drawn from the fact that engine geometries vary from small engines having a single cylinder and small displacements to engines having twelve or more cylinders and large displacements. Needs that are common to both small and large engines often exist, however, that could be resolved by the same strategy if that strategy was based on the size of the engine or a portion thereof. Thus, there is also a need to symbolically define the way attributes that are to vary during simulation, such that those symbolic definitions, are applicable to models of various sizes and configurations. There is also a need for an expert system that preserves symbolic definitions for reuse.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of the invention in accordance with a best mode contemplated for carrying out the invention.

DETAILED DESCRIPTION OF THE INVENTION

Figure 1:
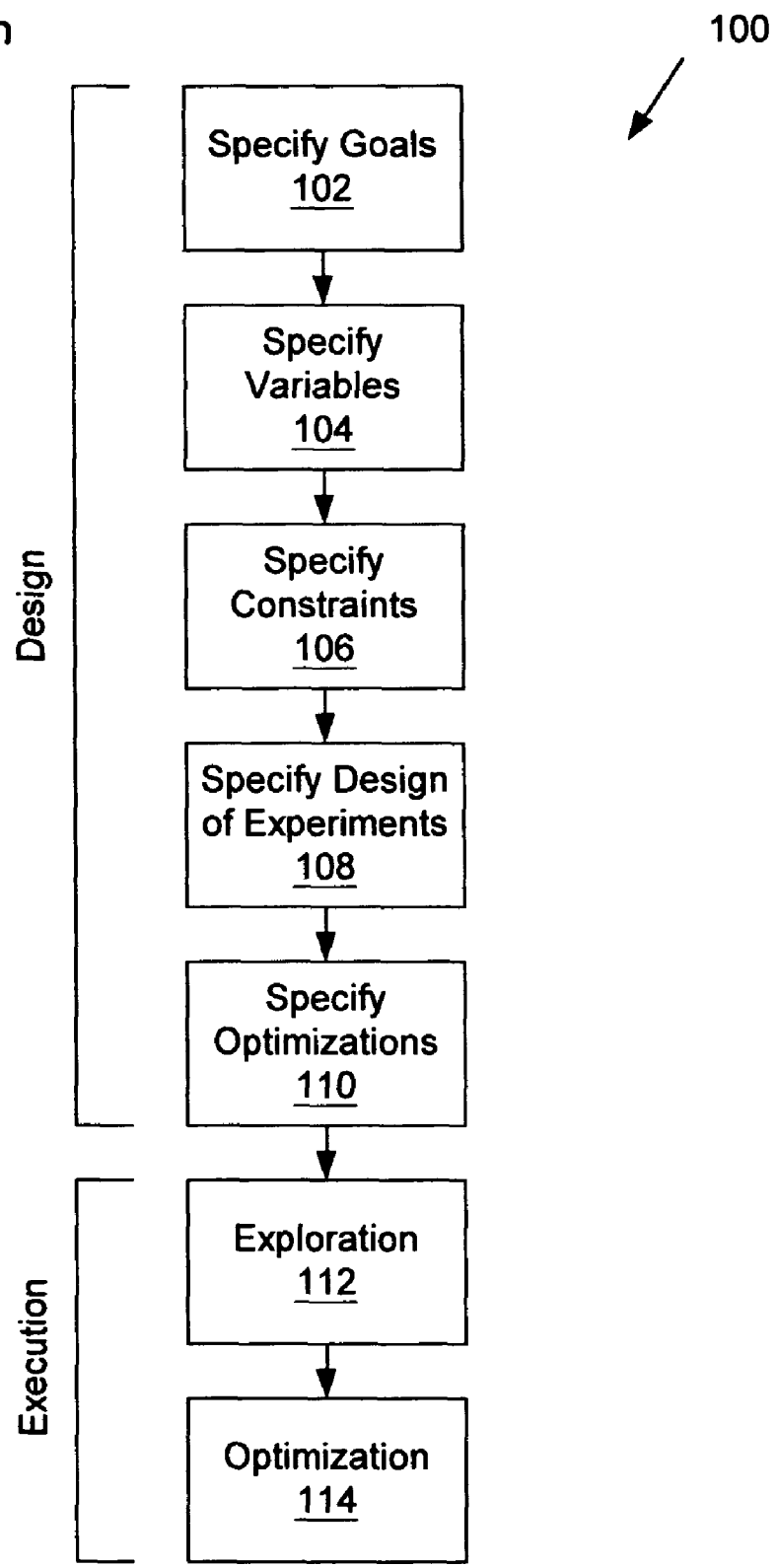
FIG. 1 is an embodiment of a design optimization flow chart in an embodiment of the present invention.

Reference will now be made in detail to the preferred embodiments of the expert system, examples of which are illustrated in the accompanying drawings. It is to be understood that the Figures and descriptions of embodiments included herein illustrate and describe elements that are of particular relevance, while eliminating, for purposes of clarity, other elements found in typical computers and computer networks.

The present expert system provides solutions to the shortcomings of certain previous design methods and systems. Those of ordinary skill in the art will readily appreciate that while embodiments of the present invention are described in connection with engine design, aspects of the invention are applicable beyond engine design. For example, the expert system techniques disclosed and claimed herein may be applicable to simulation and optimization systems for various purposes and complex computational systems in general. The user interface described herein may also be applicable in a variety of useful applications. Thus, while certain embodiments of the present invention are directed to engine design, the present invention and aspects thereof are recognized to be beneficial in a variety of applications. Other details, features, and advantages of the design optimization will become further apparent in the following detailed description of the embodiments.

Systems, apparatuses, and method to perform expert systems are described herein, including processor based apparatuses, multi-processor based systems, and articles of manufacture that contain instructions which, when executed by a processor cause the processor to perform expert systems functions. Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

While the present invention may be utilized to optimize a variety of complex apparatuses and processes, the following embodiments are directed to use of the present invention in optimizing an internal combustion engine. Such an engine has many attributes that contribute to the operation of the engine and many desirable goals. The attributes of an internal combustion engine include, for example, valve quantity and size, piston diameter and stroke, ignition timing, fuel delivery, quantity, and timing and exhaust pipe diameter and length. Goals for operation of an internal combustion engine include, for example, fuel consumption, emissions, torque, and power.

In the following description, the term "variable set" is utilized to indicate a set of variable values that may be utilized to run a single simulation. A "run" or "simulation" is an act of running a simulation on a variable set under given test conditions. A "test procedure" is a set of test conditions under which a run occurs. A "result" includes the value or values of characteristics or dependent variables from a simulation of a set of variables according to test conditions. The term "solution" refers to a group of one or more runs utilized to evaluate goals. The term "pass" indicates a collection of solutions that is ranked to find the best variable set or sets. The term "optimum" is utilized to indicate a local optimum, which is the best variable set from the ranked set of solutions of a pass. A "model" is a set of variables that may be simulated and a "design configuration" is a model embodying a design.

An expert system is generally a computer program that simulates the judgment and behavior of a human or an organization that has expert knowledge and experience in a particular field. Typically, such a system contains a knowledgebase containing information based on accumulated experience of users and the expert system. Expert systems have become known in recent times primarily for their ability to assist in diagnosis of problems. For example, computer professionals may utilize expert systems to guide them through the complex interaction of modern computer systems to diagnose the cause of computer system problems. Doctors may also use expert systems to assist them in diagnosing patient illnesses in a modern world wherein much is known about disease and sickness, but much of what is known overlaps and is contradictory.

The present expert system contemplates an expert system for use in aiding designers that desire to simulate complex devices or processes to estimate the operation of those devices or processes. For example, it is often desired by designers of devices that the operation of those devices be simulated and proven to the greatest possible degree before prototype devices are built. Simulation of complex devices is usually much faster and much less expensive than building such a device. Complex devices, even well known devices such as vehicle engines, however, are often so complex to define for simulation that it requires an expert to create an engine definition to be simulated and a strategy for how to perform the simulation. The present invention, therefore, offers a knowledgebase of expertise that may be leveraged by expert designers and novice designers to define complex models and strategies with limited information from a human designer.

The knowledgebase utilized in embodiments of the invention may include a database that is machine readable and contains knowledge utilized in the system. That knowledge may include, for example, information related to objectives, such as goal and test procedure definitions; information related to strategies, such as optimization rules; information related to models; and results of simulations and optimizations. The knowledgebase of those expert systems may provide the benefit of tracking changes made to information contained in the knowledgebase through a simulation or optimization and new information entered into the simulation or optimization system.

A comparison feature may be associated with the knowledgebase that compares information utilized in optimizations with information contained in the knowledgebase to determine what information is new and automatically store new information in the knowledgebase. Thus, the knowledgebase of the expert system may grow and be improved. For example, every new model that is created by a designer and/or the expert system may be saved in the knowledgebase, thus building a comprehensive library of models that may be used or modified for use in future optimizations. Similarly, every new strategy created by a designer and/or the expert system may be saved in the knowledgebase, thus building a comprehensive library of strategies. Alternately, rules governing information to be stored may be utilized to store, for example, only information that provides improved results. Quality of each model or strategy stored in the database may also be maintained by, for example, categorizing them as approved for proven models and strategies, unapproved for experimental models and strategies, or foreign for models and strategies brought into the system from elsewhere.

Evolution of data stored in the knowledgebase may also be maintained so that the process that created that data may be reviewed. For example, strategies that were modified to create a new strategy may be maintained in a genealogical format. The person or workstation that created information in the knowledgebase and when that information was created may also be saved for tracking purposes. The evolution data may be used, for example, by management to determine what people and processes create the highest quality models and strategies.

Thus, the present expert system may provide, for example, complete device definitions in various configurations in the knowledgebase. The expert system may then match device attributes input by a designer by way of, for example, a template to one or more complete device definitions that most closely correspond to the input attributes and select one or more of the complete device definitions for further use.

Similarly, the present expert system may provide, for example, complete strategy definitions in the knowledgebase. Those strategy definitions may, for example, define how to simulate various devices and how to formulate solutions to various goals. The expert system may then match strategy attributes input by a designer by way of, for example, a template to one or more complete strategy definitions that most closely correspond to the input attributes and save one or more of the complete strategy definitions for further use.

In an embodiment, the expert systems operate to assist in optimization. The optimization system utilized in examples provided herein include three major aspects: a base model that defines values of all attributes that are required by the simulator, an objective that is related generally to goals of the optimization, and a strategy that is related generally to which attributes of the base model will vary and to what degree they will vary during optimization.

Thus, an embodiment of the present expert system utilizes a base design that is a starting definition of attributes and components to be modified to create an optimized design. The expert system also utilizes objectives that contain one or more specifications, each specification containing one or more goals and one or more test procedures. The expert system also utilizes a strategy that includes one or more variables, constraints, and an inference engine.

Rules for optimization may be distributed throughout an optimization system. For example, rules for attributes may be embedded in the base model by, for example, defining an attribute by an equation based upon another attribute. Rules may also be embedded in objectives. For example, whether a goal is to be minimized, maximized, matched, used as a high limit, or used as a low limit are rules that may be defined in the objective. Weighting of multiple goals may also be defined in the objective. Weighting may also be applied to a plurality of points for each of one or more goals in the objective. For example, goals may be evaluated at particular rpm points. Each of those points may then be weighted independently if desired. Rules may furthermore be embedded in strategies. For example, variable parameters, constraints such as equations used to calculate certain attributes, and exploration rules may be defined in strategies.

A subtlety of embedding rules in multiple areas of an optimization system is the order in which rules will be applied. For example, if a pipe attached to an engine is defined in the base model by an equation that makes an exit diameter equal to an entrance diameter and the pipe is defined in a strategy such that the exit and entrance diameters may vary, then the priority or order of execution of those rules will determine whether a straight pipe will be required in the optimization or whether a non-straight pipe may result.

A base model or a base design configuration may include starting definitions of attributes or components to be modified by rules to create an optimized design. A "best model" may be, for example, a model that most closely approximates one or more specified values when the directive of the goal is to match those values, a model that provides the highest resulting value when the goal is to maximize that value, or a model that provides the lowest resulting value when the goal is to minimize that value. The base design may include all attributes necessary to simulate the design. Design attributes may furthermore be stored in a design attribute database. The design utilized in the examples herein is an engine design so that the base design configuration in those engine examples is referred to as a "base engine." Thus, those attributes may include dimensional data such as, for example, intake plenum dimensions, intake pipe length and diameter, exhaust pipe length and diameter, intake valve diameter, exhaust valve diameter, and cylinder length and diameter. Those attributes may also include other data such as, for example, sensed data including intake air pressure, exhaust air pressure, and throttle position. Attributes may furthermore be grouped logically by, for example, component such that an exhaust pipe length and an exhaust pipe diameter that are commonly used in combination may be grouped to define an exhaust pipe component. Those components may then be assigned names such that all the attributes for a component are grouped under a unique engine component name. The present optimization may then vary selected attributes and simulate operation of an engine having those varying attributes to achieve one or more goals.

FIG. 1 illustrates a Design Optimization 100 of the present invention. In the embodiment illustrated in FIG. 1, the Design Optimization 100 includes 2 phases of operation, Design and Execution. The Design includes Specifying Goals 102, Specifying Variables 104, Specifying Constraints 106, Specifying Design of Experiments 108 and Specifying Optimizations 110. The Execution Phase includes Exploration 112 and Solution 114.

At 102, an objective that contains one or more goals of the optimization may be specified. The objective may include a definition of the desired result of optimization. Goals may have at least three component parts: a characteristic, a directive, and a value. Each characteristic may further be an entity that is to be optimized, such as for example a performance characteristic of an engine. The directive instructs as to what is desired to be accomplished with the characteristic. For example, a directive may be an instruction to maximize the value of the characteristic, minimize the value of the characteristic, or match one or more desired values of the characteristic. The value may provide an objective standard to compare the extent to which each design configuration approaches the desired result. In certain situations, goals that are minimized or maximized may not have an associated value, whereas goals that are to be matched typically would have at least one associated value.

The goal of the present example is the singular goal of achieving maximum power through the range of engine operation specified in the test procedure. Thus, the characteristic is power and the directive is to maximize that power.

The test procedure may, for example, specify a range of operation, a stepwise increment through the range, a number of engine cycles to simulate at each rpm step, a fuel utilized by the engine, a throttle position, and ambient conditions. The range may be, for example, 5000 rotations per minute (rpm) to 10,000 rpm and the increment may be 1000 rpm steps throughout the range. The fuel may be, for example, gasoline or diesel. Ambient conditions include air temperature, air pressure, and humidity at intake and exhaust points.

As has been mentioned, goals may be minimized, maximized, or matched to a desired value or a set of values. Where matching is desired, the value associated with the goal may be matched to, for example, a curve or set of values defining a curve. Goals may also be utilized as limits on the design. For example, a goal may be set with a high limit, a low limit, or a band having both high and low limits. Moreover, more than one goal may be established for a simulation. Thus, for example, a user may attempt to match a desired power curve while setting a particular high limit on carbon monoxide in the exhaust of an engine. In that example, all results producing a carbon monoxide level greater than the limit will be disregarded and the best fits to the power curve having a carbon monoxide level below the limit will be provided as results.

The high limit is the specification of a value or set of values for a parameter above which a design configuration is unacceptable. A high limit may, for example be placed on a parameter such as fuel consumption to prevent a resulting design from being overly inefficient as to fuel consumption. If the high limit is exceeded at any point, then the simulation may be considered to have failed for that variable set.

The low limit is the specification of a value or set of values for a parameter below which a design configuration is unacceptable. A low limit may, for example, be placed on a parameter such as power to prevent a resulting design from having too little power. If a variable set produces a value that is below the low limit at any point during the simulation, then the simulation may be considered to have failed for that variable set.

A limit band includes a high and low limit, such that if the high limit is exceeded for a set of variables at any point during the simulation or the variable set produces a value that is below the low limit at any point during the simulation, then the simulation may be considered to have failed for that variable set.

A failed variable set typically is not used in the ranking of variable sets to determine the best result.

A strategy is a process used to obtain an objective. A strategy typically includes one or more variables and may or may not contain one or more constraints.

At 104, the variables to be optimized are specified. "Optimized" variables are those variables that are to be varied in the optimization simulations in order to accomplish the goals. Two variables are to be optimized in the embodiment described as an example herein: exhaust pipe length and exhaust pipe diameter. An initial value of each variable to be optimized may be assigned. Boundaries of values for which the simulation is to be run may then set. It has been determined for the present example that an exhaust pipe having a length of between 100 mm and 1000 mm is desired to fit the vehicle that the engine is operating. It has also been determined for the present application that an exhaust pipe having a diameter of between 100 mm and 200 mm is desired to fit the vehicle. Since only exhaust pipes having a length between 100 and 1000 mm will be considered, the boundaries for exhaust pipe length are 100 mm and 1000 mm. Similarly, the boundaries for exhaust pipe diameter are 100 mm and 200 mm. Where each variable represents an axis of a grid, the area encompassed by the boundaries may be viewed graphically and referred to as a "design space."

The number of engines to be simulated may be limited, for practical purposes, by use of tolerances with variables or attributes that are permitted to vary during optimization. A tolerance may be set at a minimum increment desired for a variable such that variable values to be simulated will be limited to values falling at tolerance points. Without use of a tolerance, an infinite number of designs to be simulated would exist in any design space. By utilizing tolerances, infinitely small steps in the design space are eliminated and a finite number of simulations is forced to exist in a design space. When tolerances are used, variable values to be simulated are rounded to the nearest tolerance point so that values falling between those points are not simulated. A design tolerance may be equal to a manufacturing tolerance but may also be simply the amount of each step that a designer wishes the optimization to consider. For example, it may be desired to consider exhaust pipes in lengths having 10 mm increments and diameters having 1 mm increments. Thus, a tolerance for exhaust pipe length may be set at 10 mm and a tolerance for exhaust pipe diameter may be set at 1 mm. Graphically, the bounded design space may now be viewed as a grid having points located on every multiple of each tolerance. With regard to tolerances, a global tolerance may be set that is based upon a function of that variable such as the magnitude of the variable. Where desired, however, the tolerance for a variable may be set to any value. Tolerances may also be offset so that tolerance points may begin at other than zero or another multiple of the tolerance. Thus, for example, an exhaust pipe may be desired to be considered in 10 mm increments beginning a 25 mm, thereby providing a tolerance offset. The exhaust pipe lengths to be considered would then be in 10 mm increments from 25 mm (e.g., 25 mm, 35 mm, 45 mm, etc.).

Optimization having variables set at tolerances also provides a natural termination for the optimization program. Once all tolerance points around a point from which optimization is occurring have been simulated and do not yield a better value of the characteristic, the optimization may be terminated. Use of tolerance based simulation, furthermore, beneficially reduces the number of simulations run because variable values that are near each other are rounded to the same tolerance point and simulation of the same point need not be performed twice. Rather, the present invention is capable of recognizing that a variable set to be simulated is the same as a variable set previously simulated and so does not simulate that same variable set a second time.

At 106, constraints, including parametric equations, are specified. An initial design attribute may be defined as a constant value or by a parametric equation. Parametric equations are referred to herein as a type of constraint. A parametric equation defines an attribute in terms of one or more other attributes. An attribute that is defined by a parametric equation may not be optimized. It may, however, change as variables being optimized change. For example, the entrance diameter of a pipe may be defined as being equal to the diameter of a port to which it connects. The pipe entrance diameter will, therefore, vary as the port size varies. Alternately, a parametric equation could define the geometry of a component, such as a parallel pipe, by equating the exit diameter to the entrance diameter. Thus it is assured that only configurations in which inlet and outlet of the pipe are equal will be considered. As another example of a parametric equation, the stroke of an engine may be based on the displacement and bore stroke ratio of the engine.

In an embodiment of the present invention, variable sets for design configurations in the design space are simulated in two steps. The first step, called exploration herein, simulates variable sets in various regions of the design space and the second step, called optimization herein, simulates design configurations in the most promising regions of the design space. In exploration, a small number of variable sets are selected to determine which region or regions in the design space are most promising. Thus for example, three values for each variable may be selected so as to be dispersed evenly across a range of values to be considered for each variable. In optimization, design configurations adjacent to the most promising design configurations explored in exploration are simulated to find optimum solutions in those regions.

At 108, attributes for a design of experiments are specified. The design of experiments attributes may determine how many design configurations will be simulated in exploration 112 and optimization 114. Design of experiments attributes may include a number of levels to be explored for each variable, the number of best runs desired for further consideration, the number of other regions desired for further consideration, and a number of runs limit. The level is a number of values for each variable that are to be considered during exploration. Viewed graphically with each variable defining an axis on a graph beginning with the lowest value to be considered and ending with the highest value to be considered, levels are a number of points to be simulated on each axis in exploration 112. The number of solutions to be simulated for exploration 112 may, thus, be the product of the number of levels for each variable.

Global or local levels may be set for the variables when specifying the design of experiments 108. When global levels are assigned for all variables, the same number of values are considered for each variable. For example, a global level of 3 may be provided by default. Where three values are selected for each variable, the number of design configurations that will be considered in exploration is $3^n$, where n is equal to the number of variables in the design configuration.

When local levels are set for each variable, the number of values to be considered during exploration is selected individually for each variable. Furthermore, a global level may be provided as a default and overriding local levels may be specified for one or more of the variables being explored. A level of zero may also be specified such that exploration 112 is disabled for one or more variables. Alternately, values may be specified by a user for consideration in exploration 112 or another technique may be utilized to select the values to be used in exploration 112.

A number of best runs may be specified to instruct optimization 114 as to how many design configurations most closely approximate the goal are to be retained. Those best design configurations often lie close to each other in a single region. The best design configurations may, however, lie in disparate parts of the design space and may result from optimizing more than one design configuration found in exploration 112.

It may be desired that optimum design configurations in one or more local optimum regions of the design space (regions not containing the best design configuration) be provided. For example, solutions in a local optimum region may be close enough to the goal to satisfy a designer and may be substantially more cost effective to implement. Thus, a number of other regions may be specified to provide optimum designs so that design configurations in local optimum regions are also provided by optimization 114.

A number of runs limit may also be specified such that a limit is placed on the number of design configurations to be simulated. The number of runs limit may be accomplished by randomly selecting design configurations to be simulated from the total number of design configurations that could be simulated. A random number seed may, furthermore be specified in a computer system so that the same design configurations may be simulated by choosing the same seed and different design configurations may be simulated by selecting a different seed.

Figure 7A:
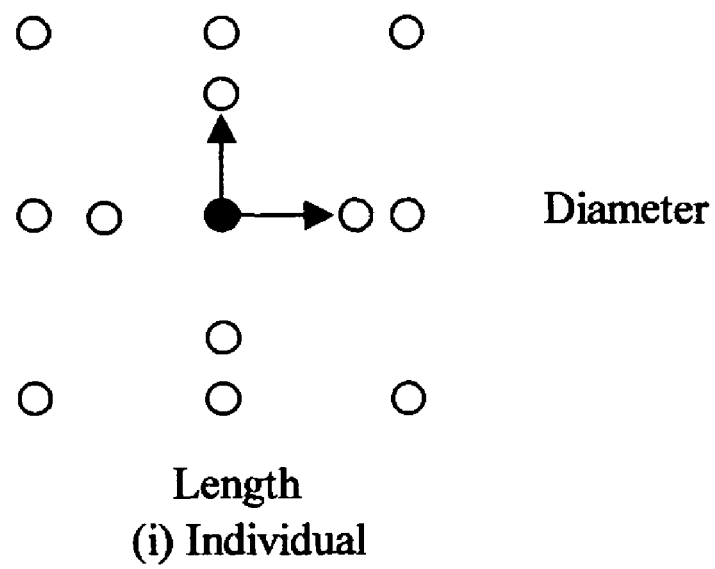
FIG. 7a illustrates an embodiment of variables changing individually.
Figure 7B:
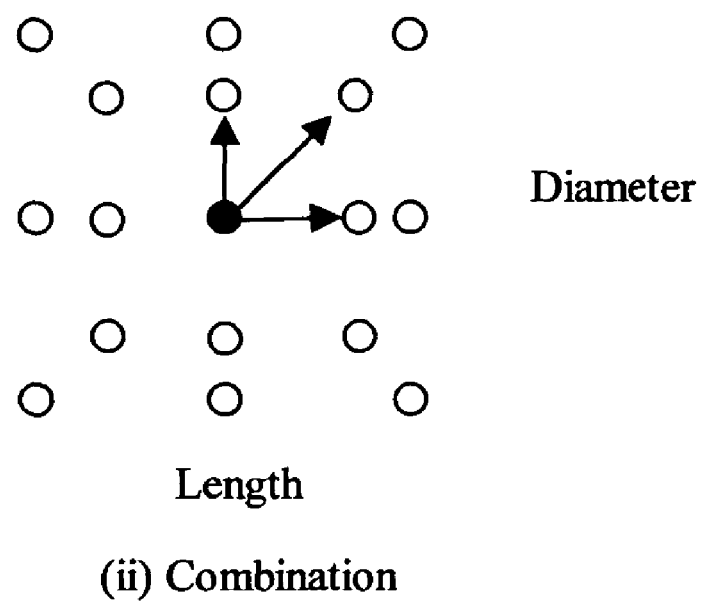
FIG. 7b illustrates an embodiment of variables changing in combination.

Optimizations are specified at 110. In optimization, adjacent design configurations may be simulated by stepping from a base design simulation to adjacent design configurations to find optimum solutions in each region selected in exploration 112. In the optimization specification phase, a determination of whether and how variables are to be combined in optimization 114 is made. As has been explained hereinbefore, variables may be optimized individually or in combination. Steps may be applied during optimization 114 as "individuals" where only one variables is changed when simulating adjacent design configurations or as "combinations" where a combination of at least two variables are changed when simulating adjacent design configurations. FIG. 7a illustrates an example wherein variables are changed individually, creating four new design configurations to be simulated and FIG. 7b illustrates an example wherein variables are changed in combination, creating eight new design configurations to be simulated. As may be seen by that example, many more design configurations are presented for consideration by the optimization system when parameters are considered in combination than individually.

It may be noted that all variables may be combined or uncombined or subsets of the variables may be combined in one or more combinations.

In addition, step and step delta start and end factors may be specified, a threshold may be specified, an optimization methodology may be specified, and a limit on the number of runs for each pass of the optimization may be specified. Step size may be defined for each variable. A step may define an area on a grid, above and/or below a base point, that will be considered in optimization. One useful step size is the distance between exploration points, which causes optimization to form a base point at each surrounding exploration point. Step delta start and end factors may be defined as percentages of the step or portions of the step. A step delta start factor may define the distance from a base point, as a portion of a step, at which the first optimization pass will occur. A step delta end factor may define the distance from a base point, as a portion of a step, at which the last optimization pass will occur if the optimization is not terminated by other means. Moreover, one or more variables may be eliminated from the optimization 114 because those variables were only necessary for exploration 112.

The step delta factors may be used by the optimization to determine a new value for a variable set based on a portion of the distance between two adjacent points on the exploration grid. The threshold may be evaluated at each pass to determine whether the optimization is complete. The optimization may thus terminate upon reaching a threshold or may terminate prior to reaching a threshold for other reasons. For example, another reason that optimization may terminate is because design configurations for all tolerances in the design space surrounding the base point have been simulated and no better result was found.

The optimization methodology for the present embodiment is based on a steepest decent analysis. Alternately, a downhill simplex or other form of analysis may be utilized. Downhill simplex does not allow any combinations and may not perform ideally in combination with tolerances, since it depends upon small changes to keep it progressing.

As was previously discussed, a limit for the number of runs to be simulated in each pass may be specified if such a limit is desired and a random number seed may be specified in case the limit is exceeded to limit the number of optimizations performed.

During exploration 112, the design space may be explored combining all the variables based upon the levels of each variable or other specified values. A baseline simulation may be run initially. The baseline simulation may be run for comparison to other simulated configurations. Thus, for example, an engine for a vehicle may be optimized for power by varying exhaust pipe length and diameter. The simulation may utilize values from the baseline simulation that define a complete engine for all design configurations while varying values for exhaust pipe length and diameter only. Thus, if an engine to be optimized is currently utilizing an exhaust pipe that is 700 mm long and 150 mm in diameter, power may be determined for that configuration over a desired range of engine speeds for the baseline simulation. The range of engine speeds for this example will be 5000 to 10,000 rpm. The result of the baseline simulation may then be compared to other variations of exhaust pipe length and diameter examined during the optimization.

It is not necessary, however, to run a baseline simulation. Simulation results may simply be ranked to determine which configurations of the variables are best. Exploration 112 may calculate the result (in the present example engine power) at the various defined points within the boundaries set for the variables (in the present example exhaust pipe lengths from 100 mm to 1000 mm and diameter from 100 mm to 200 mm). Those results may then be ranked to determine which configurations of the variables provide the best results.

Figure 2:
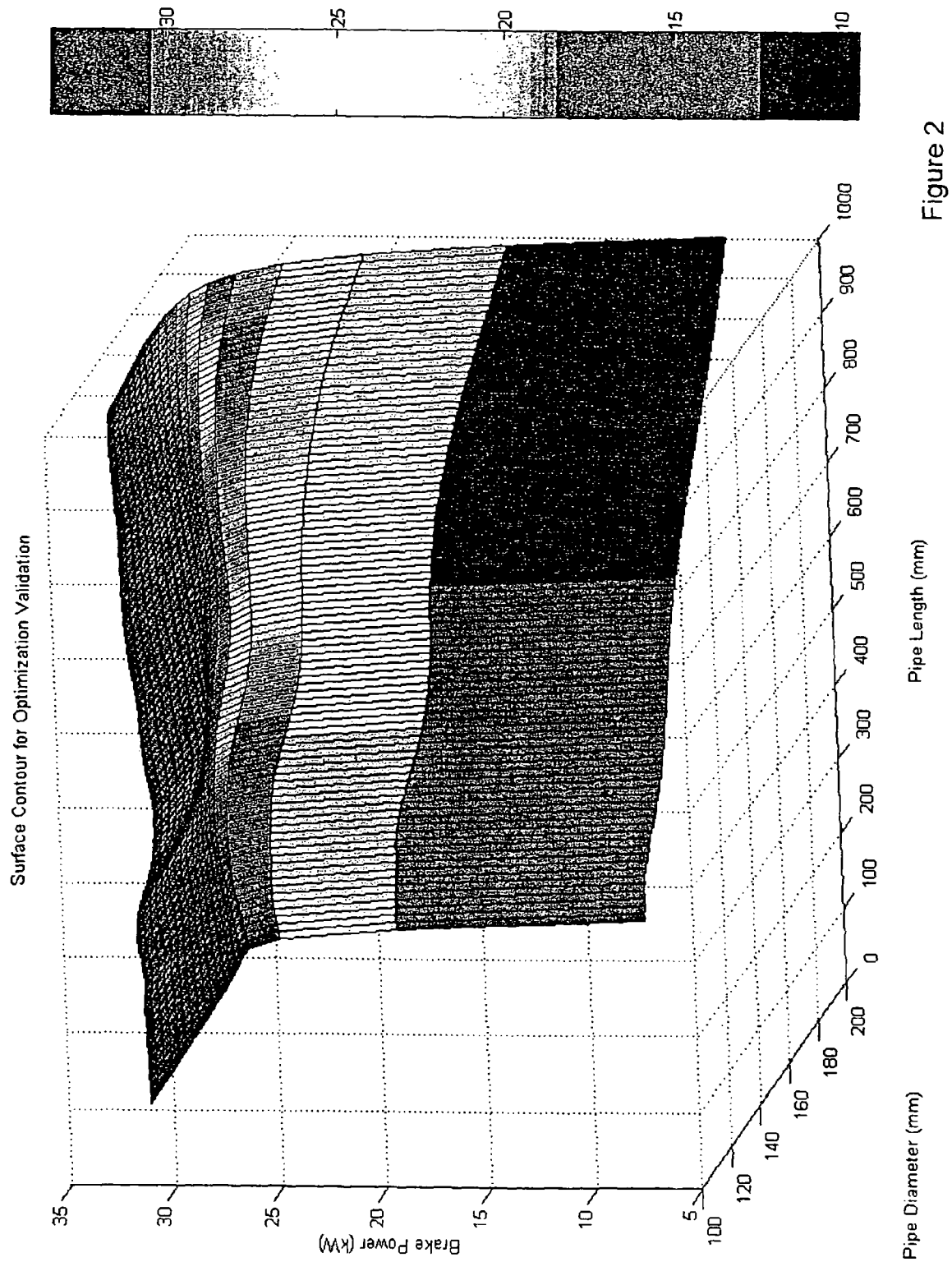
FIG. 2 depicts a sample set of simulations of exhaust pipe length and diameter graphically.

FIG. 2 depicts a sample set of simulations of exhaust pipe length and diameter graphically. Power performance is depicted topographically on a landscape plane with the minimum exhaust pipe length of 100 mm set as a left boundary, the maximum exhaust pipe length of 1000 mm set as a right boundary, the minimum exhaust pipe diameter of 100 mm set as a lower boundary and the maximum exhaust pipe diameter of 200 mm set as an upper boundary. In FIG. 2, exploration was performed in fine resolution to demonstrate an example of the values of the power contour in the design space.

Figure 3:
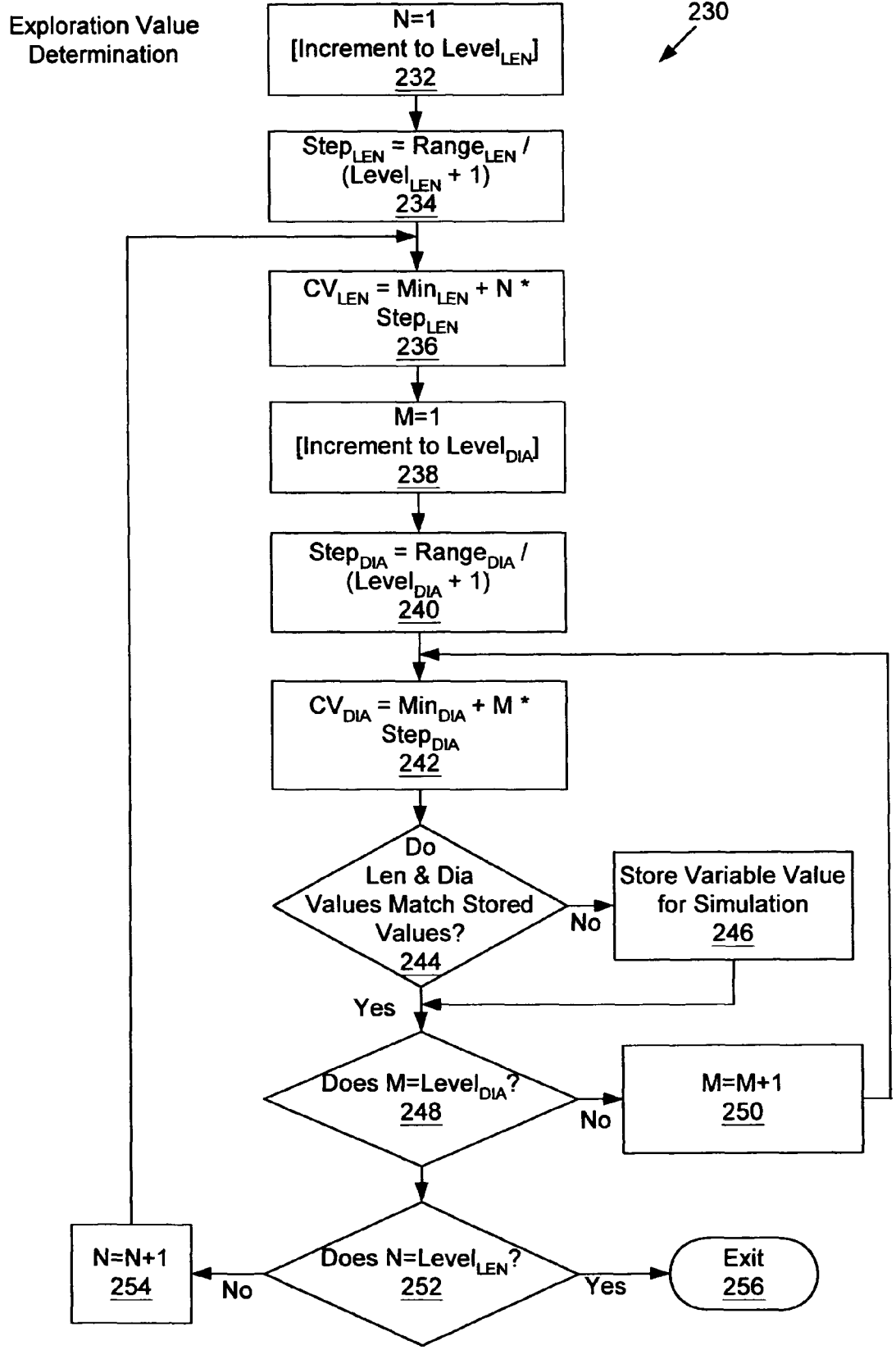
FIG. 3 illustrates a method of determining combined values for exploration in an embodiment of the present invention.

FIG. 3 illustrates a method of determining combined values 230 for exploration 112 of the present invention. The method 230 operates visually to create a two-dimensional grid corresponding to two variables. It should be recognized, however, that the present invention may be utilized to optimize any number of variables. The range for each variable in the method 230 illustrated is equal to the maximum boundary value for that variable less the minimum boundary value for that variable. At 232, a counter "N" is set to 1. As will be seen at 252 and 254, that counter will be incremented until it reaches the level set for the first variable which, in the embodiment illustrated, is exhaust pipe length ("Len"). At 234, a step is calculated that divides the range for length into equal portions. A variable value for the first division of length is calculated when 236 is first executed. Thus, graphically, the distance on an X-axis from the minimum length into the length range for the first design of experiments point is determined at 236. The distance on a Y-axis from the minimum diameter to that first design of experiments point is next determined to pinpoint the first design of experiments point. Thus, a nested loop for exhaust pipe diameter is entered at 238. At 238, a counter "M" is set to 1. As will be seen at 248 and 250, that counter will be incremented until it reaches the level set for the second variable which, in the embodiment illustrated, is exhaust pipe diameter ("Dia"). At 240, a step is calculated that divides the range for diameter into equal portions. A variable value for the first division of diameter is calculated when 242 is first executed. Thus, in the present embodiment that considers only two variables, the exhaust pipe length and exhaust pipe diameter of the first design of experiments point to be simulated is the intersection of the length resulting from step 236 and the diameter resulting from step 242.

In a certain embodiment wherein duplicate variable values may be produced by the method described in FIG. 3, variable values to be simulated are stored in a database or table. After each iteration, wherein a new set of variables to be used to run a simulation is developed, the variable set associated with the simulation may be compared to the variable sets stored in the database. Thus, if a variable set already exists in the database, the duplicate variable set may be discarded so as not to waste simulation resources on an additional simulation of the variable set. Therefore, at 244, the length and diameter determined at 236 are 242 are compared to values previously calculated and stored in a database. If the length and diameter values match previous values, the current values are not stored and the method returns to 248 to calculate the next design of experiments point. If, however, the length and diameter values do not match any saved in the database, then the current design of experiments values are saved in the database at 246 for future simulation.

At 248, if counter "M" is less than the level selected for the second variable "diameter," then counter "M" is incremented at 250 and the process returns to 242 to calculate the desired diameter value for the next step. When counter "M" is equal to the level selected for second variable "diameter" then the process proceeds to 252. At 252, if counter "N" is less than the level selected for first variable "length," then counter "N" is incremented at 254 and the process returns to 236 to calculate the desired length value for the next step. When counter "N" is equal to the level selected for first variable "length" then the process ends at 256.

It should be recognized that values calculated in the design of experiments value determination method 230 of FIG. 3 need not be saved in a database but may, for example, be simulated immediately after they are calculated. The method described in connection with FIG. 3, however, beneficially eliminates duplicate simulation. It should also be noted that when the loop for the first variable is incremented, it is not necessary to recalculate the diameter points because the diameter values will match those calculated in the first pass. Thus a recursive algorithm, may beneficially be employed to efficiently determine the design of experiments points to be simulated.

Figure 4:
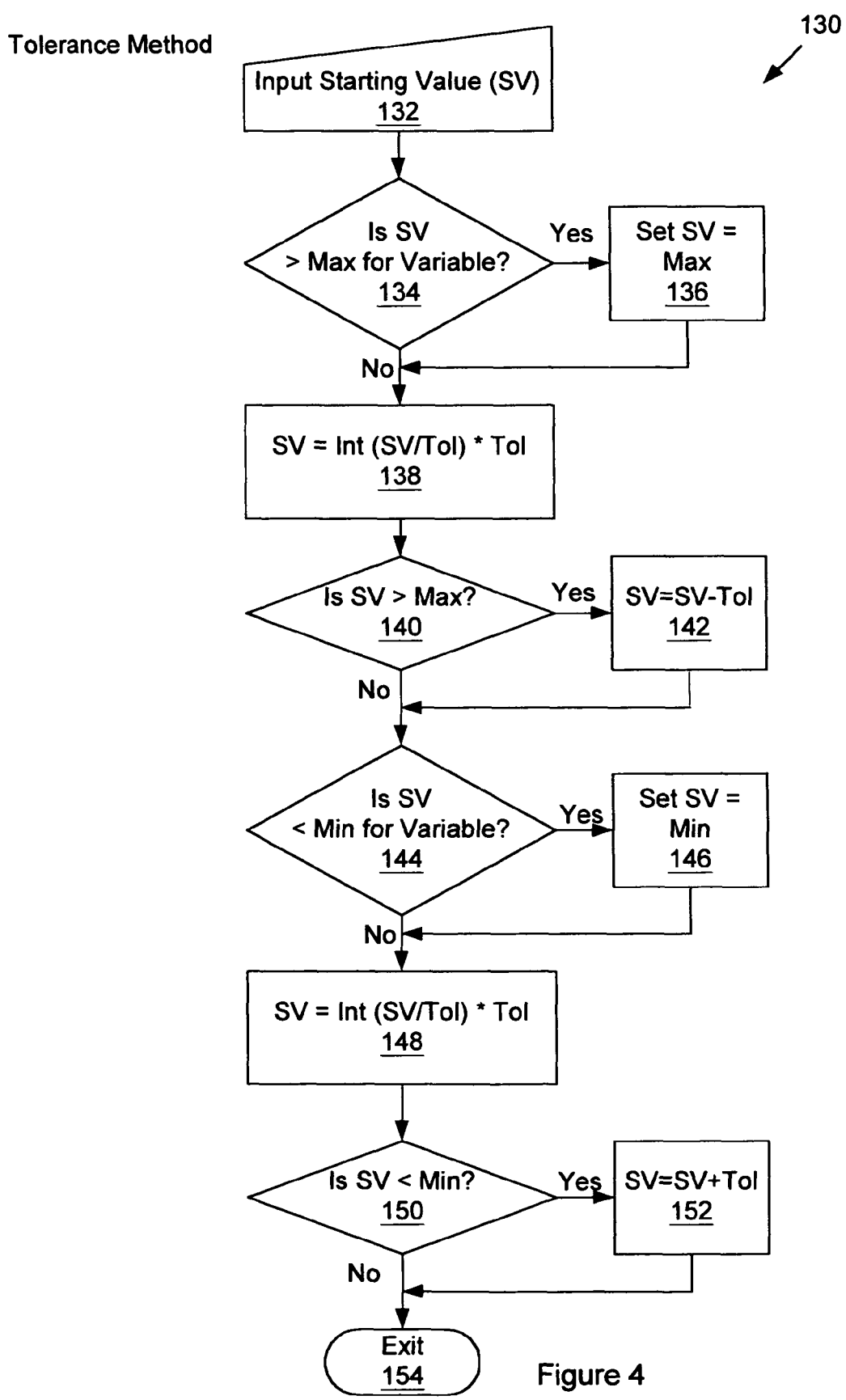
FIG. 4 depicts a tolerance determination method in an embodiment of the present invention.

FIG. 4 depicts a tolerance determination method 130 that assures the value of a variable to be utilized in a particular run is within the desired range and of the desired magnitude to fall on a tolerance point. Where, as in the present embodiment, there are multiple variables being considered in each solution, the method of selecting parameters associated with a variable 130 may have to be performed once for each variable being considered. At 132, a desired starting value is input into the tolerance method. At 134-142 the tolerance method 130 assures that the input starting value is not greater than the maximum boundary set for that variable and at 144-152 the tolerance method 130 assures that the input starting value is not less than the minimum boundary set for that variable.

At 134, the starting value is checked to determine whether it is greater than the maximum boundary for that variable. If the starting value is greater than the maximum boundary set for that variable then the starting value is given the value of the maximum boundary at 136. At 138, the starting value is set equal to the integer of the starting value divided by the tolerance and that value is multiplied by the tolerance. A value other than an integer may alternately be specified at 138. Thus, at 138 the starting value is set at a multiple of the tolerance. As an example, if an exhaust pipe length of 1005 mm is input, the maximum length to be considered is 1000 mm, and the tolerance is 10 mm, then the starting value will be set equal to the 1000 mm maximum length at 136. The integer of (1000 mm/10 mm)*10 mm is 1000 mm. Thus it is confirmed that 1000 mm is a multiple of the tolerance of 10 mm.

Where a rounded integer function is used at 138 and a boundary is not set at a multiple of the tolerance, it is possible for the result of the equation of 138 to fall outside of the boundary. Therefore, at 140 and 142, the method will subtract one tolerance from the starting value if the starting value is greater than the maximum boundary set.

At 144, the starting value is checked to determine whether it is less than the minimum boundary for that variable. If the starting value is less than the minimum boundary set for that variable then the starting value is given the value of the minimum boundary at 146. At 148, the starting value is set equal to the integer of the starting value divided by the tolerance and that value is multiplied by the tolerance. Thus, at 148 the starting value is always set at a multiple of the tolerance. At 150 and 152, the method will add one tolerance from the starting value if the starting value is less than the minimum boundary set and at 154 the tolerance method terminates.

During exploration 112 sets of values for the variables spread evenly within the boundaries may be generated and simulations run for each of those sets. In the present embodiment, all sets of values to be explored are calculated first and then each simulation is run. A benefit to that ordering is that multiple simulations may be run simultaneously. That ordering is particularly advantageous where the simulations are performed on a network of computers wherein multiple processors are available to run simulations simultaneously. Simulations may, however, alternately be run as the variable values are determined.

Figure 5:
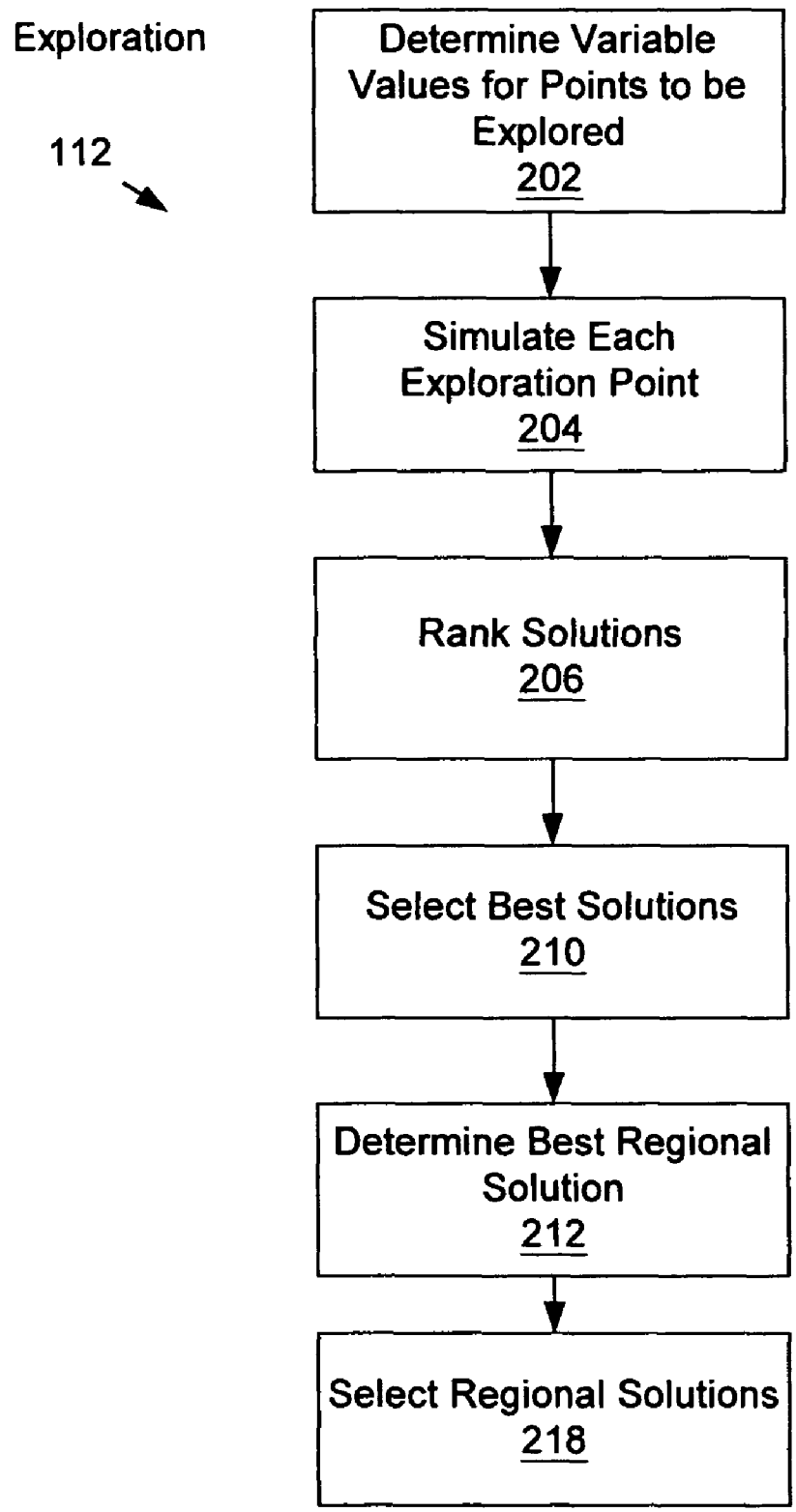
FIG. 5 illustrates a method of performing exploration in an embodiment of the present invention.

FIG. 5 illustrates a method of performing exploration 112 of the present invention. At 202, values for variables at various design of experiments points within the boundaries are determined. Those points are typically located grid-like between the boundaries set for each variable to arrive at a sampling of solutions across the entire range of values to be considered. At 204, a solution is run on each design of experiments point and a result for the goal is determined for each of those design of experiments points. At 206, the solutions are ranked with the solution most closely approaching the goal ranked first and the solution farthest from the goal ranked last. The number of best solutions desired are collected at 210. At 212, the best regional solutions are determined by, for example, using a steepest climb analysis. The steepest climb analysis includes (i) determining the steepest climb at each point, and (ii) creating a collection of all points that did not climb toward any adjacent point. A climb occurs where an adjacent point has a more desirable result. The steepest climb occurs toward the point having the most desirable result of all adjacent points. At 218, any points that were determined to be best solutions at 210 are eliminated and the best regional solutions are ranked. Next, at 218 a number of regional best solutions equal to the number of other regional solutions desired is selected.

If the number of runs created in exploration 112 exceeds the number of runs limit, then variable sets are either selected or deselected until the number of simulations to be run is equal to the runs limit. Selection or de-selection may be based on a randomization. Moreover, the randomization may be seed based such that the results are repeatable or modifiable as desired.

Figure 6:
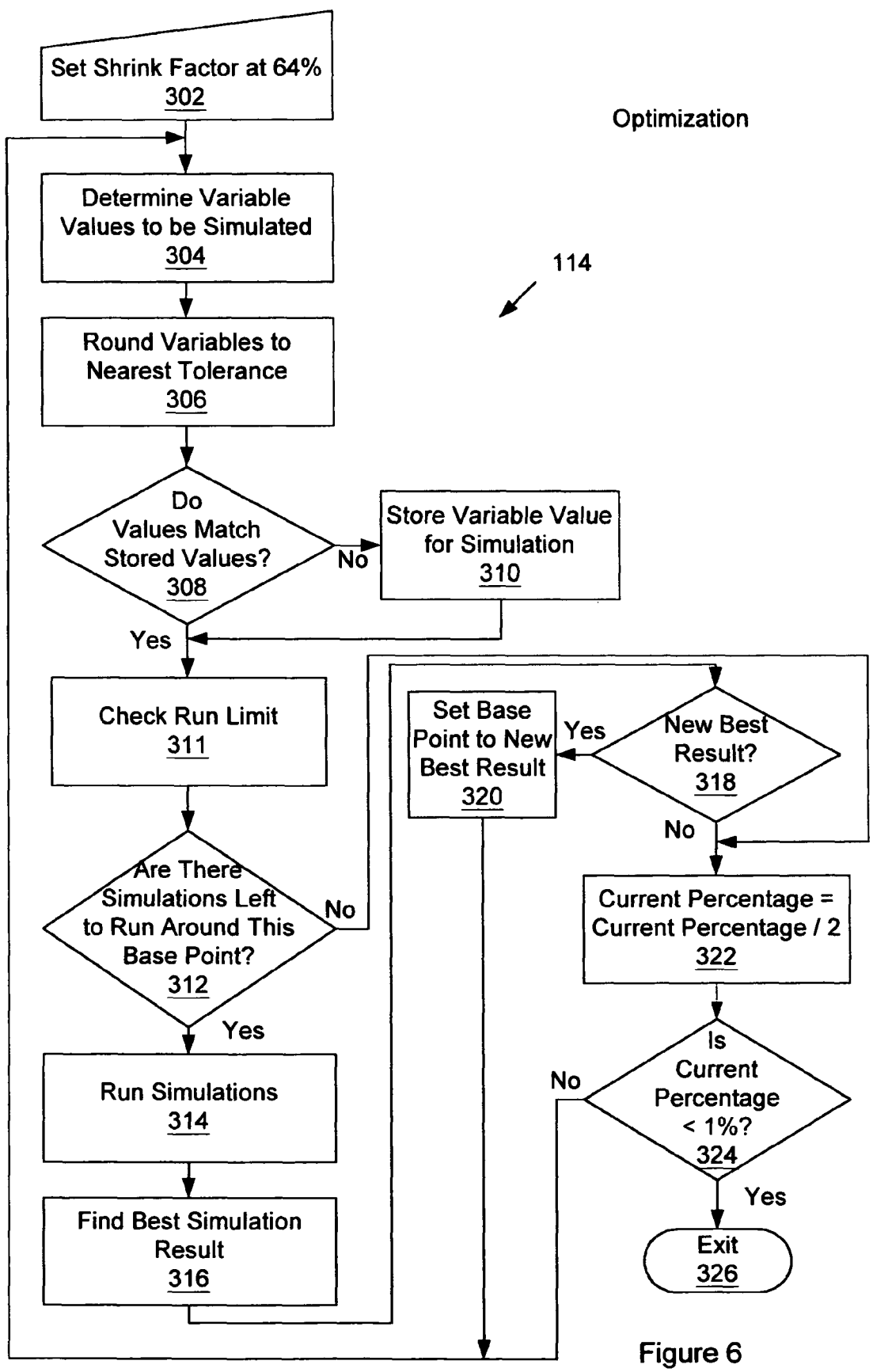
FIG. 6 illustrates optimization in an embodiment of the present invention.

FIG. 6 illustrates an embodiment of optimization 114. The term "base point" will be utilized to describe a point from which a solution pass will occur. Optimization 114 simulates design configurations adjacent to base points and selects the best design configuration. That best design configuration for the pass is the design configuration that results in a value or values most nearly approximating the desired goal value or values. The best design configuration from a pass then becomes the base design for the next optimization pass. If none of the generated design configurations in a pass improve on the base design configuration then design configurations in the design space nearer to the base design will be simulated in the next pass. When a new base engine is selected for the next pass, the process is termed "migration." When the same base engine is retained for the next pass and simulation of design configurations nearer that base design are performed, the process is termed "shrink." Thus, in migration, the base engine is moved from one location on the grid to another so that additional engines may be generated around that improved engine. In shrink, the base engine is maintained in its current location and alternative engines nearer to that base engine are generated.

Step size is based on the step delta specified during specification of optimization 110. The optimization may continue the process of migration and shrink until a step delta end factor has been reached or design configurations for all tolerances adjacent to the base point have been simulated and no better result of the characteristic was found. Thus, for example, the step delta start factor may be 64% of the step delta and the step delta end factor may be 1% of the step delta. Designs may, thereby, be simulated 64% of the step from the base point initially, then 32% of the step from the base point, 16% of the step from the base point, 8% of the step from the base point, 4% of the step from the base point, 2% of the step from the base point, and 1% of the step from the base point as shrinkage passes occur. As has previously been noted, during migration, engine designs from previous passes that overlap on the current pass may not be selected for regeneration since they were previously generated.

The optimization begins at 302 by setting a shrink factor to the step delta start factor previously specified. It has been found through experimentation that a first pass having a shrink factor that is equal to 64% of the step size between exploration points is beneficial and so a 64% shrink factor will be used in the following example and the distance between exploration points for each variable will be used as the step size for each variable.

At 304, values for simulations propagating from the current base point are determined. As may be seen in FIGS. 7a and 7b, each solution pass may be performed individually or in combination. FIG. 7a illustrates a solutions pass occurring for length and diameter variables individually, while FIG. 7b illustrates a solutions pass occurring for length and diameter variables simultaneously. In the present two variable example, performing a solutions pass on the variables individually would cause the simulator to select additional values to be simulated that are adjacent to the base point at (i) the base point length value and the base point diameter value plus 64% of an exploration step in the diameter direction, which may be referred to as a plus model for diameter, (ii) the base point length value and the base point diameter value minus 64% of an exploration step in the diameter direction, which may be referred to as a minus model for diameter, (iii) the base point length value plus 64% of an exploration step in the length direction and the base point diameter value, which may be referred to as a plus model for length, and (iv) the base point length value minus 64% of an exploration step in the length direction and the base point diameter value, which may be referred to as a minus model for length, as plotted on FIG. 7a. In the present example, performing the solutions pass on the variables in combination would cause the simulator to select the additional values selected in an individual solutions pass and additional values at, (i) the base point length value plus 64% of an exploration step in the length direction and the base point diameter value plus 64% of an exploration step in the diameter direction, referred to as a plus-plus model, (ii) the base point length value plus 64% of an exploration step in the length direction and the base point diameter value minus 64% of an exploration step in the diameter direction, referred to as a plus-minus model, (iii) the base point length value minus 64% of an exploration step in the length direction and the base point diameter value plus 64% of an exploration step in the diameter direction, referred to as a minus-plus model, and (iv) the base point length value minus 64% of an exploration step in the length direction and the base point diameter value minus 64% of an exploration step in the diameter direction, referred to as a minus-minus model, as plotted on FIG. 7b.

It is noted that where two or more variables are considered in a simulation, any two or more variables may be combined while other variables are considered individually or separately in combination. Furthermore, the present invention contemplates dynamic combination of variables based on the degree of improvement in the result from the best solution of the previous pass. The dynamic combination could include, for example, any variable that changed in the best result of the previous pass combined with other unchanged variables. Alternately, any or all of the variables that changed in the best result of the previous pass may be combined. Moreover, any or all of the variables that changed in the last pass may be combined with any or all of the unchanged variables. For example, each unchanged variable may be combined with a combination of any or all of the variables that changed in the previous pass.

At 306, the tolerance method illustrated in FIG. 4 is applied to all variables.

As was previously discussed, variable sets that have been simulated may be stored in a database and newly determined variable sets may be compared to those previously simulated variable sets so that duplicate variable sets may be discarded and not simulated for a second time. Thus, at 308, the variable sets determined at 304 and 306 are compared to variable sets already simulated and at 310 non-duplicative variable sets are saved to the database.

At 311, if the number of runs created in an optimization pass exceeds the number of runs limit, then variable sets are either selected or de-selected until the number of simulations to be run is equal to the runs limit. Selection or de-selection may be based on a randomization. Moreover, the randomization may be seed based such that the results are repeatable or modifiable as desired.

At 312, a determination is made as to whether any additional simulations exist to be simulated around the current base point. Because the present embodiment is tolerance based, as solutions passes are performed a time may arise when all multiples of the tolerance around a base point have been explored. When all tolerance multiples around a base point have been explored, the solutions process will proceed to 322. If all tolerance multiples around a base point have not been explored the solutions process will proceed to 314.

At 314, simulations are run on each variable value set in a pass, and at 316 the latest simulation results are compared to previous simulation results to find the best simulation result to that time.

At 318, a determination is made as to whether one of the results of the last solutions pass is better than the previous best result and is greater than the previous best result by more than the threshold. If one of the results in the last solutions pass is the best result, then the base point is reset to the new point having the best result at 320 and the process returns to 304. If none of the results of the last solutions pass is the best result, the solutions process proceeds to 322. At 322, the current percentage is divided by two or some other factor and at 324 a decision is made as to whether the current percentage is less than the step delta end factor. If the current percentage is greater than or equal to the step delta end factor, the process returns to 304 to make another solutions pass at, for example, half the distance from the base point. If the current percentage is less than the step delta end factor the optimization terminates at 326. Of course, terminating at a percentage of the step delta end factor is not necessary, but it beneficially prevents simulations from continuing past a point where the benefit derived from further simulation is minimal.

The optimization results may be normalized. For example, results may be normalized to account for differences in the magnitude of each goal. Thus a normalized result might be based on the percent of the average result. Results may also be weighted so that one goal is given a greater weighting than another where goals are of varying importance.

One technique that may be used in connection with goals is referred to herein as "match design." Match design is a specification of a set of values, such as power or fuel consumption, for evaluating the results of a simulation by computing the least squares fit to produce an error value. Error values may furthermore be normalized, for example, to account for differences in the magnitude of the results for each goal. Thus a normalized error value might be based on the percent that the average results vary from a desired match. Error values may also be weighted such that one error value is given a greater weighting than another where goals are of varying importance.

Dynamic priority is an automatic process that the optimization uses to determine its own priority in relation to other optimizations that may be running concurrently. Dynamic priority could, for example, be the negative of the number of runs created in a pass, thus giving higher priority to a pass having a smaller amount of runs. In an embodiment, marking an optimization as done provides a way for the user to abort the optimization.

After completion of an optimization, the optimization system may automatically determine the sensitivity of each variable. That may be accomplished by moving one tolerance step, or another desired amount, to the positive and one tolerance step, or another desired amount, to the negative for each variable and performing a simulation at each of those points. The sensitivity may then be calculated by adding the difference between the resulting goal value at the optimum value and the resulting goal value at one step to the negative to the difference between the resulting goal value at the optimum value and the resulting goal value at one step to the positive for of each variable (i.e., $I\Delta_1 I + I\Delta_2 I$).

In an embodiment of the present invention, a base model selection expert system may be employed to assist in selecting a base model having attributes and the same or a different expert system may be employed to assist in selecting an optimization strategy for optimizing that model. Related to selecting base engine attributes, engine attributes may be stored in an engine attribute database portion of the knowledgebase. Those attributes may include dimensional data such as, for example, intake plenum dimensions, intake pipe length and diameter, exhaust pipe length and diameter, intake valve diameter, exhaust valve diameter, and cylinder length and diameter. Those attributes may also include other data such as, for example, sensed data including intake air pressure, exhaust air pressure, and throttle position. Attributes may furthermore be grouped logically by, for example, component such that an exhaust pipe length and an exhaust pipe diameter that are commonly used in combination may be grouped to define an exhaust pipe component. Those components may then be assigned names such that all the attributes for a component are grouped under a unique engine component name. Components may furthermore be combined into groups. For example, eight cylinders in an eight cylinder engine may be combined into a group of cylinders.

Attributes or components defining a variety of engine configurations may be stored within the engine attribute database so that a variety of preconfigured engines may be available for optimization. For example, attributes or components for a two-stroke single cylinder engine may be defined as well as attributes or components for a four-stroke twelve cylinder engine. Thus, the expert system may assist in defining a wide variety of engines or other models.

Engine attributes or components may, furthermore, be identified by the expert system so that appropriate attributes or components may be grouped to define a working engine of the desired type. For example, where a four cylinder engine having two liters of displacement is desired, attributes or components for an engine having those characteristics and that is known to function well may be grouped by the expert system to create a definition of an engine that may be used for optimization. Because so many attributes may be involved in defining an engine, it will be assumed in the following examples that all attributes have been logically grouped as components. Thus components, each of which may contain more than one attribute, will be combined to create an engine definition in each example.

An initial engine attribute may be defined as a constant value or by a parametric equation. A parametric equation defines an attribute in terms of one or more other attributes. For example, the entrance diameter of a pipe may be defined as being equal to the diameter of a port to which it connects. Alternately, the parametric equations could define the geometry of a component, such as a parallel pipe, by equating the exit diameter to the entrance diameter. As another example, the stroke of an engine may be based on the displacement and bore stroke ratio of the engine.

In an embodiment of the present invention, an engine configuration expert system is employed to assist in selecting an initial engine configuration to be optimized. The engine configuration expert system may, for example, receive certain information that specifies aspects of an engine that is input by a user. The engine configuration expert system may recognize that a complete engine definition requires that more aspects of an engine be specified than were specified by the user. The engine configuration expert system may then specify additional engine aspects based on the aspects specified by the user. The engine configuration expert system may then provide a complete engine specification, based on the specifications provided by the user and including the additional aspects specified by the engine configuration expert system. Thus, in that embodiment of the present invention, a complete engine may be specified by the engine configuration expert system given only a partial specification by the user. The complete engine specification may then be optimized as desired by the user.

The engine configuration expert system may select a model by comparing a value specified by the designer for a first attribute to values of that first attribute in the stored models and selecting each model having a first attribute value that matches the value specified for the first attribute. If a second attribute is specified by the designer, the value of that attribute may be compared to a second attribute in the base models that matched the first attribute. Additional attributes may be compared in similar manner and the model or models most closely matching the attributes specified by the designer may be returned as suggested base models.

An objective, as used herein, includes a definition of the desired result of the expert system. An objective for an optimization may include one or more sub-objectives. Each sub-objective may furthermore include at least one goal and at least one test procedure that will be utilized to evaluate the results of the model with respect to the goals. Goals, might be, for example, results of engine operation, also known as engine output. Engine outputs include, for example, power, torque, and emissions of certain chemicals such as carbon monoxide. Goals may, thus, be set to minimize or maximize an engine output. Goals may furthermore be set to match an engine output to a desired value or a set of values forming, for example, a curve. Goals may also be set as limits on the engine to be designed. Where limit goals are set, the goal may be set as a high limit, a low limit, or a band having both high and low limits.

Thus, for example, a user may attempt to match a desired power curve while setting a particular high limit on carbon monoxide in the engine exhaust. In that example, all results producing a carbon monoxide level greater than the limit will be disregarded and the best fits to the power curve having a carbon monoxide level below the limit may be provided as results.

Each objective created may be saved along with a genealogical link to its previous version, if there is one, in a knowledgebase so that it can be reused. Thus, objectives in the knowledgebase may continually increase and improve.

Another expert system that may be used in conjunction with the engine configuration expert system or separately from the engine configuration system is a strategic expert system. The strategic expert system selects a strategy for optimizing a model. The strategic expert system may, for example, receive certain information that specifies attributes of optimization strategy for an engine that were input by a user. The strategic expert system may recognize that a complete optimization strategy requires that more aspects of a strategy be specified than were specified by the user. The strategic expert system may then specify additional optimization strategy attributes based on the attributes specified by the user. The strategic expert system may then provide a complete optimization strategy specification based on the attributes provided by the user and including the additional attributes specified by the strategic expert system. Thus, in that embodiment, a complete optimization strategy may be specified by the strategic expert system given only a partial specification by the user. The optimization strategy may then be utilized to optimize an engine specified by, for example, a user or the engine configuration expert system.

In an embodiment of the expert system, a strategy includes variables, constraints, and an inference engine, the inference engine having attributes. Those variables and constraints and the inference engine furthermore define how base model attributes will be modified to accomplish the objective. Strategy attributes may also be grouped into strategy components to correspond with base model components. Model attributes that vary are referred to as "variables" herein. Each variable may include, for example, a minimum value, a maximum value, a tolerance, and levels. Where they exist, the minimum value and maximum value may be viewed as defining the boundaries of a design space. The tolerance, where specified, determines allowable values for the strategy attribute by forcing the base engine attribute value to be a multiple of the tolerance plus an offset where applicable. Constraints are base model attributes that vary by way of an equation with one or more variable values. Constraints allow a user to define design constraints such as, for example, maintaining a parallel pipe section if the entrance diameter is changed as part of the optimization, or maintaining an overall pipe length by adjusting a section length as a function of another section length. The expert system may furthermore be used during strategy development to obtain assistance in defining strategy attributes.

Exploration, such as that illustrated in FIG. 5, may be used to evaluate points distributed throughout the design space, and is typically followed by optimization of the exploration points having the desired results, such as the optimization illustrated in FIG. 6. Levels, when they are utilized in exploration, may operate as described previously herein and may specify how many values the base engine attribute will have during an exploration of the design space if such exploration is desired. For example, if a variable has a total range of 250 mm and exploration is to assess the impact of that variable at increments of 25 mm then the levels would be set to 11. Alternately, if exploration were to assess the variable in increments of 50 mm then levels would be set to 6.

If automatic calculation of levels is desired, which is referred to herein as "auto levels," the inference engine may compute the number of levels based on the maximum number of engines specified by the corresponding inference engine attribute. For example, consider an example wherein auto levels is selected, the maximum number of engines specified to be simulated in exploration is 256, and two variables are being optimized. In that example, the inference engine would compute that sixteen values should be considered for each variable in exploration. Sixteen values for the first variable times sixteen variables for the second variable equal a total of 256 points to be simulated in exploration.

As an example, an exhaust pipe component having two variables, each having minimum and maximum values and a tolerance, is desired to be designed to match a power curve. A user may specify that exhaust pipe diameter and length attributes may be permitted to vary to match a desired power curve. Minimum and maximum values for exhaust pipe diameter and length may be used, for example, to match packaging requirements. A tolerance might be set to standard pipe diameter and length increments. Simulations may then be run to find an exhaust pipe that most clearly matches the desired power curve.

Each strategy created may be saved along with a genealogical link in a knowledgebase and may be reused. The genealogical link may thus also be used to indicate previous uses of a strategy and the success of that strategy and its predecessors, in addition to who developed the strategy. Thus, strategies in the knowledgebase may continually increase and improve.

In an embodiment of the engine design expert system, symbolic components may be utilized to relate one or more strategy attributes to one or more base design attributes. A benefit of the use of symbolic components is that strategies to be used in conjunction with a variable can be reused in connection with other variables or the same variable in another model configuration. Thus, for example, a range of valve diameters to be considered for an engine may be defined in the strategy attributes to be related to cylinder diameter and number of valves per cylinder. That strategy may then be used to optimize valve diameter for engines having a variety of sizes and configurations. Typically, once it has been determined that a strategy is successful in creating a design having a particular desired result, that strategy may be retained and reused to achieve that or similar desired results from other base designs.

In an embodiment utilizing symbolic components, a strategy component is initially assigned a symbolic name. For example, an exhaust pipe may be assigned the symbolic name "Exhaust Runner1." "Exhaust Runner1" may then be linked to an initial engine component defining an exhaust pipe.

The strategy component may, furthermore have one or more symbolic variables associated therewith. Those symbolic variables may be counterparts to the variables in a component of the base model with which the symbolic variable is associated. Thus, a symbolic component may define some or all variables in a base model component.

Symbolic strategy components may be defined as absolute values, relative values, or percentage values. Absolute values may be entered as fixed numbers and cause the variable to be optimized only for values lying between the minimum and maximum absolute values. Relative values are amounts that are subtracted from the current value to arrive at the minimum value for optimization and added to the current value to arrive at the maximum value for optimization. Percent values may be a percentage of the current value to be subtracted from the current value to arrive at the minimum value and to be added to the current value to arrive at the maximum value.

As an example of a use of a symbolic strategy component, a base engine component called "EXP1" may be selected to be utilized in the base model. That base engine component may define a straight exhaust pipe and may include a first attribute for exhaust pipe outlet diameter having a value of 100 mm, a second attribute for exhaust pipe inlet diameter having a value of 100 mm and a third attribute for exhaust pipe length having a value of 1000 mm.

Where "EXP1" is desired to be optimized, a symbolic component containing an optimization strategy for optimizing an exhaust pipe may be created or selected if it already exists. The name of that symbolic strategy component may be, for example, "Exhaust Runner1," as used in the present example. "Exhaust Runner1," in this example, specifies that the minimum outlet diameter is 25 mm, the maximum outlet diameter is 200 mm and the tolerance for outlet diameter is 5 mm so that only outlet diameters of 25 mm to 200 mm in increments of 5 mm may be simulated during optimization. "Exhaust Runner1" also specifies that inlet diameter is equal to outlet diameter so that only straight pipes will be simulated. Moreover, "Exhaust Runner1" specifies that length is to be varied from the base engine value minus 50% of that value to the base engine value plus 50% of that value.

If base engine component "EXP1" is linked to symbolic strategy component "Exhaust Runner1," optimization may simulate the base engine attributes while varying exhaust outlet diameter from 25-200 mm, varying exhaust inlet diameter to be equal to the exhaust outlet diameter, and varying exhaust length from 500-1500 mm.

As may be seen, if "Exhaust Runner1" were to be applied to a base engine having an exhaust outlet diameter of 100 mm, an exhaust inlet diameter of 75 mm, and an exhaust length of 2000 mm, optimization would still vary exhaust outlet diameter from 25-200 mm because those are set as absolute values in "Exhaust Runner1." Similarly, optimization would still vary exhaust inlet diameter to be equal to exhaust outlet diameter because exhaust inlet diameter is defined to be equal to exhaust outlet diameter in "Exhaust Runner1." Exhaust length, however, would vary from over different ranges. such as 1000-3000 mm for the base engine having a 2000 mm length, because exhaust length strategy is defined in "Exhaust Runner1" as a percentage of the exhaust length value of the base engine.

Thus, it may be seen that strategies may be defined symbolically so as to be applicable to various base models. Similarly, various strategies may be applied to a vase model to arrive at optimum solutions having different configurations.

Symbolic components may also be saved in the knowledgebase within the strategy, thus increasing groupings of information in the knowledgebase that may be used for other applications.

Additional aspects may be added to a specification by matching specified aspects to a library stored in a database. For example, physical characteristics of an engine may include dimensions such as, for example, fuel delivery and ignition timing characteristics and a cam profile. An engine library may include a plurality of engine definitions wherein each engine definition includes every one of the listed physical characteristics. A user may enter certain engine configuration information including, for example, engine displacement, number of cylinders, block configuration (i.e., 90° V or 60° V), or number of valves per cylinder and the engine configuration expert system will select a complete engine definition most closely matching the information input by the user from the library.

Figure 8:
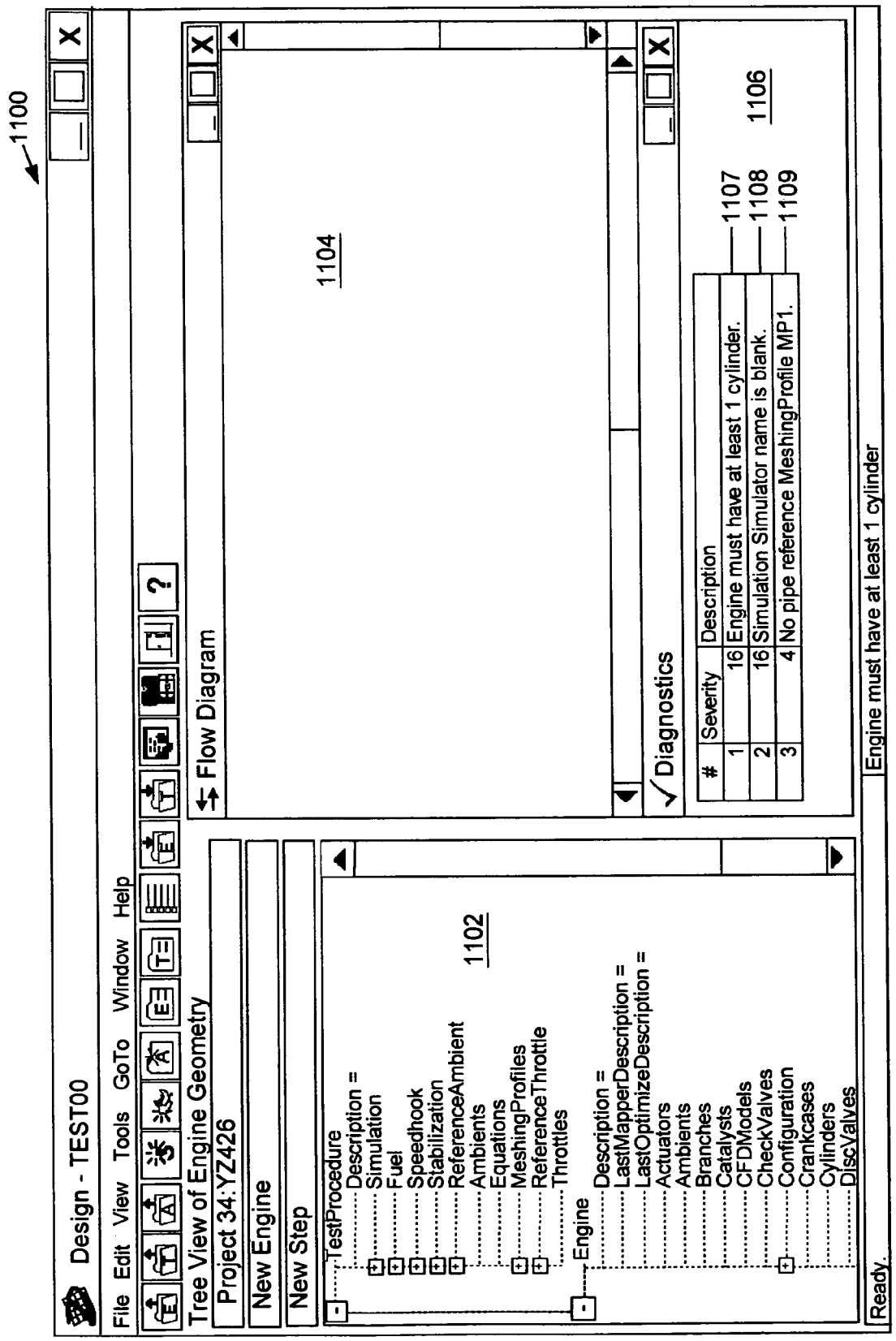
FIG. 8 illustrates a design screen in an embodiment of the present invention.

FIG. 8 illustrates an embodiment of a design screen 1100. The design screen 1100 includes a tree view window 1102, a flow diagram window 1104, and a diagnostics window 1106. The tree view window 1102 includes data utilized in performing an engine optimization. That data may include, for example, information that defines the engine to be optimized and information regarding how the optimization is to be conducted. The Tree View window 1102 displayed in FIG. 8 includes a test procedure in a hierarchical style and a base engine with all its components and a in a hierarchical style of Component Collections, Components and Values, wherein component collections are collections of similar components that can be displayed by selecting a plus sign next to the component collection.

The diagnostic window 1106 provides information to a user regarding the status of entries in the design screen 1100. The diagnostic window may inform the user of any warnings and/or errors that may exist in the model or test procedure being defined. For example, in line one 1107 of the diagnostic window 1106, the user is informed that an engine definition must contain at least one cylinder and no cylinder has yet been defined. The user is thereby provided with relevant information regarding the design screen 1100 prior to executing the engine design program to confirm that appropriate information has been entered into the design screen 1100.

Figure 9:
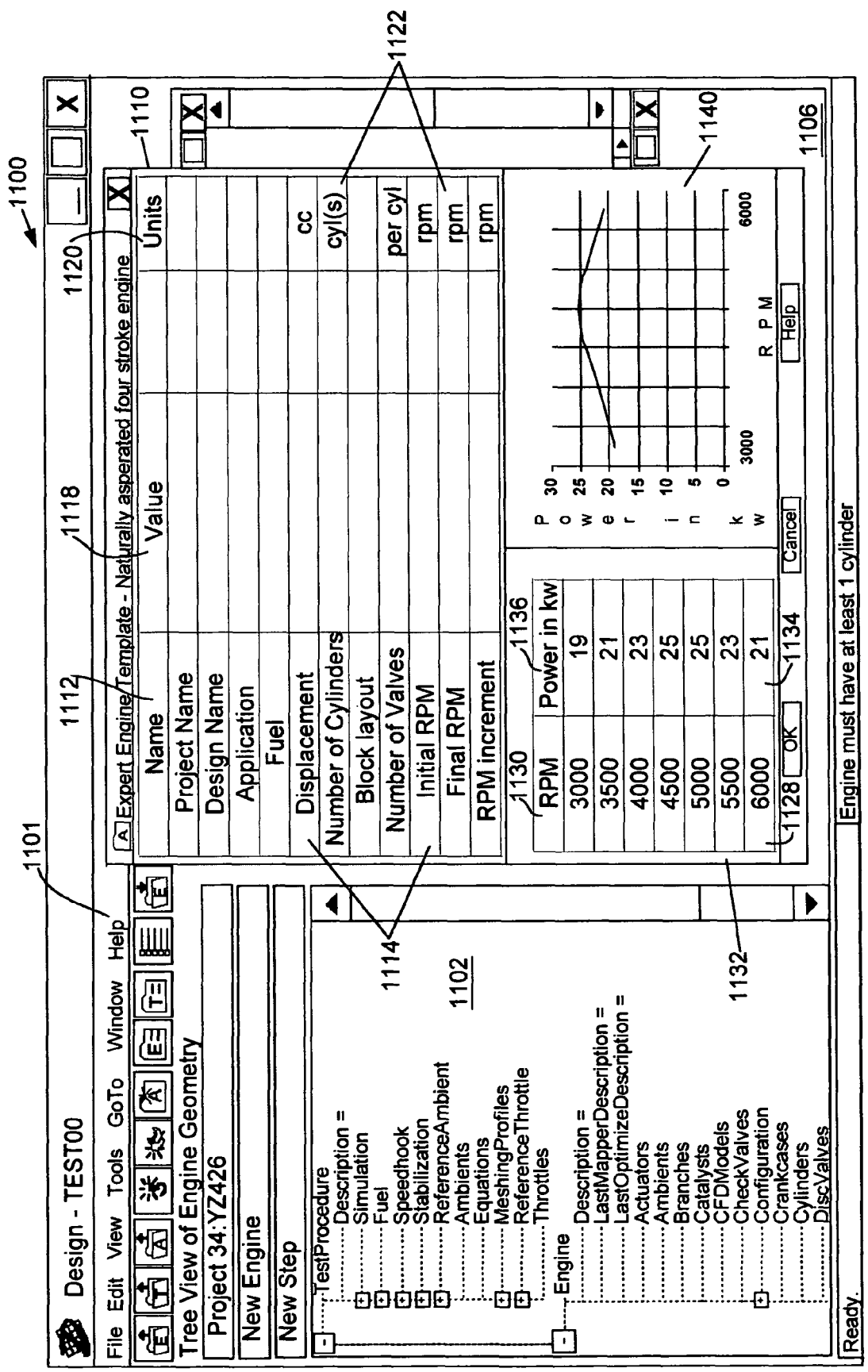
FIG. 9 illustrates the design screen of FIG. 8 with an embodiment of an expert engine template opened.
Figure 10:
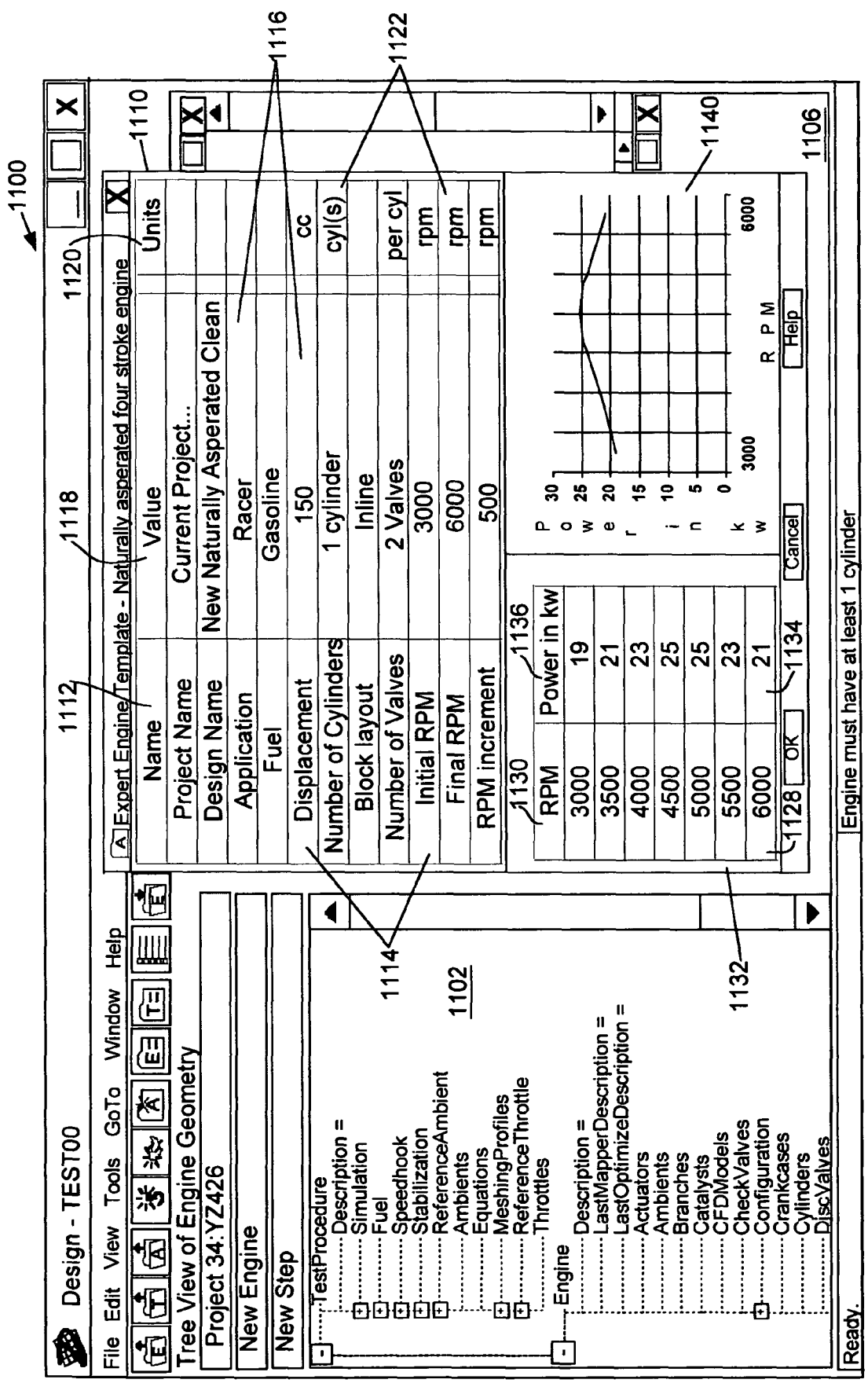
FIG. 10 illustrates the design screen of FIG. 9 with values entered into the expert engine template.

FIG. 9 illustrates the design screen 1100 of FIG. 8 with an embodiment of an expert engine template 1110 opened that may be completed by a user. The engine specification template 1100 may be opened by selecting "File," "New," and "Expert Template" from the main menu 1101, for example. The engine specification template 1110 provides spaces in which a user may provide basic engine information from which the engine configuration expert system may select one or more complete base engine specifications most closely matching the information entered in the template 1110. The expert engine template 1110 provides items 1114 in a name column 1112 that are attributes of an engine to be optimized. As is shown in FIG. 10, a user may enter characters 1116 to be placed in a values column 1118 for items 1114 in the name column 1112. The characters 1116 may be numbers, letters, or entries selected from a menu such as a drop-down menu. A units column 1120 provides units 1122 for characters 1116 in the values column 1118 where applicable.

The expert engine template 1110 of FIG. 9 is tailored to permit a power match at selected engine speeds. Other templates may be provided to assist in creating engines having other design criterion or non-engines having any desired design criterion. Desired engine speeds 1128 are entered in an RPM column 1130 of a power entry window 1132. A desired power 1134 at each engine speed 1128 is entered in a power column 1136. A plot 1140 of desired power 1134 at the listed engine speeds 1128 is created from the entered power 1134 and engine speed 1128 data.

Figure 11:
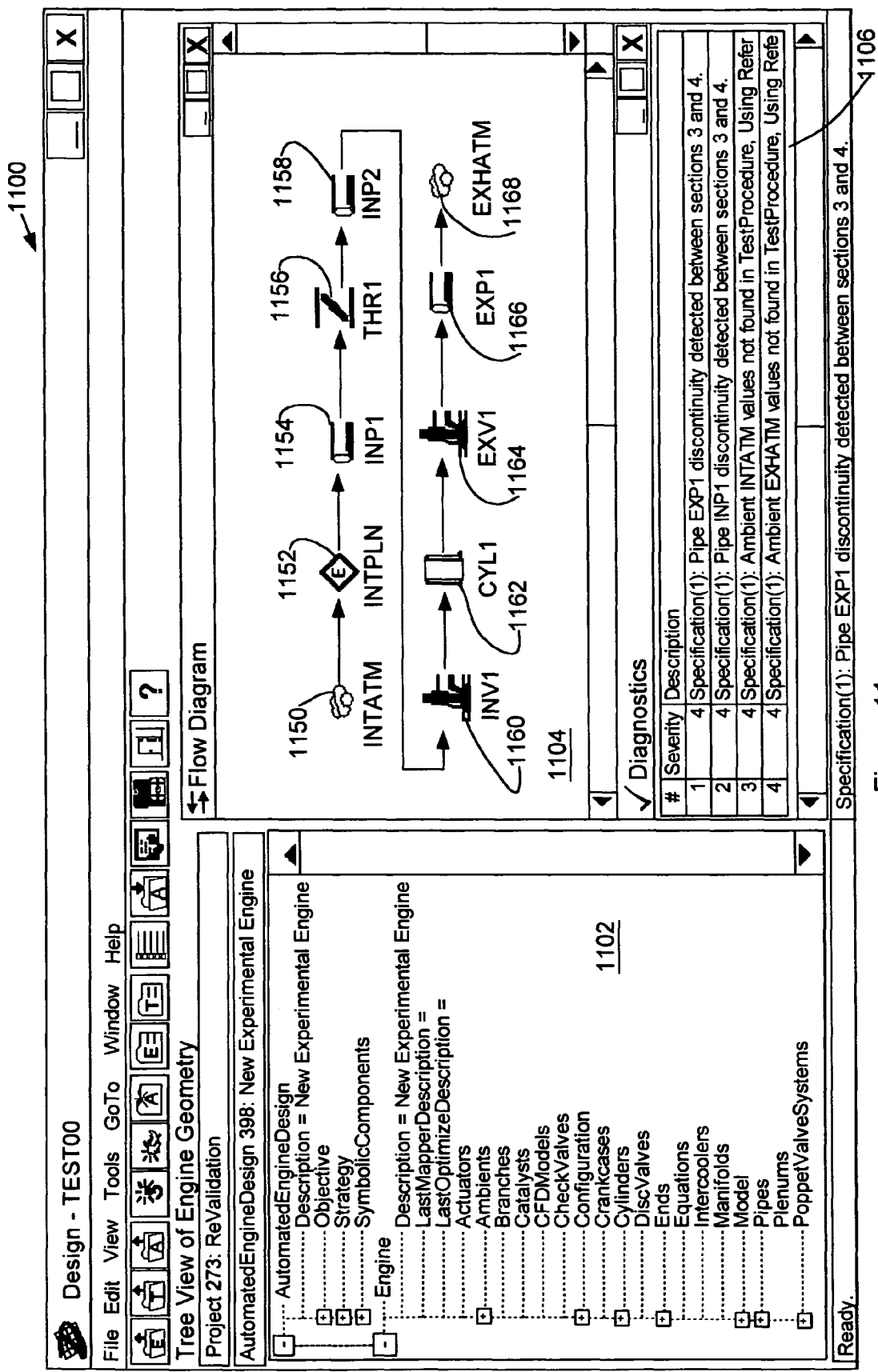
FIG. 11 illustrates the design screen of FIG. 8 having an engine defined therein.

FIG. 11 illustrates the design screen 1100 of FIG. 8 having an engine defined therein and illustrating an automated engine design in the tree view 1102. The engine may be defined by selecting engine components from the tree view 1102, placing symbols representing those components in the flow diagram 1104, and linking the components as desired. The flow diagram window 1104, thus, may include definitions of each component of the engine that may be considered in the optimization. In the example illustrated in FIG. 11, the flow diagram window includes: (i) air intake pressure (INTATM) 1150, (ii) intake plenum size (INTPLN) 1152, (iii) first intake pipe (INP1) 1154, (iv) throttle (THRT1) 1156, (v) second intake pipe (INP2) 1158, (vi) intake valve (INV1) 1160, (vii) cylinder (CYL1) 1162, (viii) exhaust valve (EXV1) 1164, (ix) exhaust pipe (EXP1) 1166, and (x) exhaust pressure (EXHATM) 1168 at the outlet of the exhaust pipe.

Figure 12:
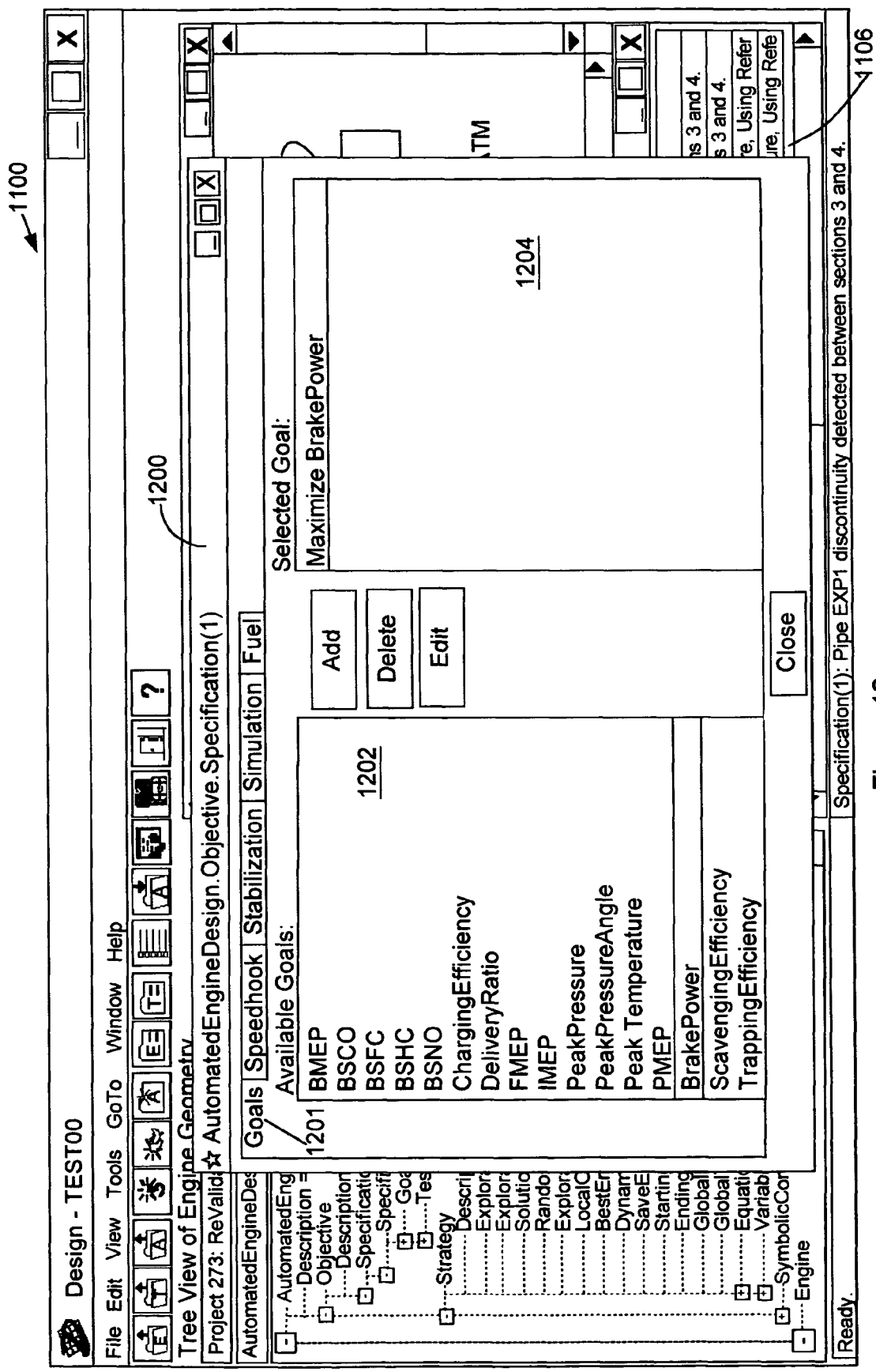
FIG. 12 illustrates the design screen of FIG. 8 having an embodiment of an objective specification screen opened with a goals tab selected.

FIGS. 12-17 illustrate objective creation. FIG. 12 illustrates the design screen 1100 of FIG. 8 having an embodiment of an objective specification screen 1200 opened with a goals tab 1201 selected. The objective specification screen 1200 may be opened by right clicking a mouse when the mouse pointer is over "Specification(1)" in the tree view 1102 and selecting "Design" from the menu produced. An available goals window 1202 provides goals that may be selected and a selected goal window 1204 includes all goals selected for the current objective specification. It should be noted that multiple specifications may be defined for an objective and multiple goals may be included in each specification.

Figure 13:
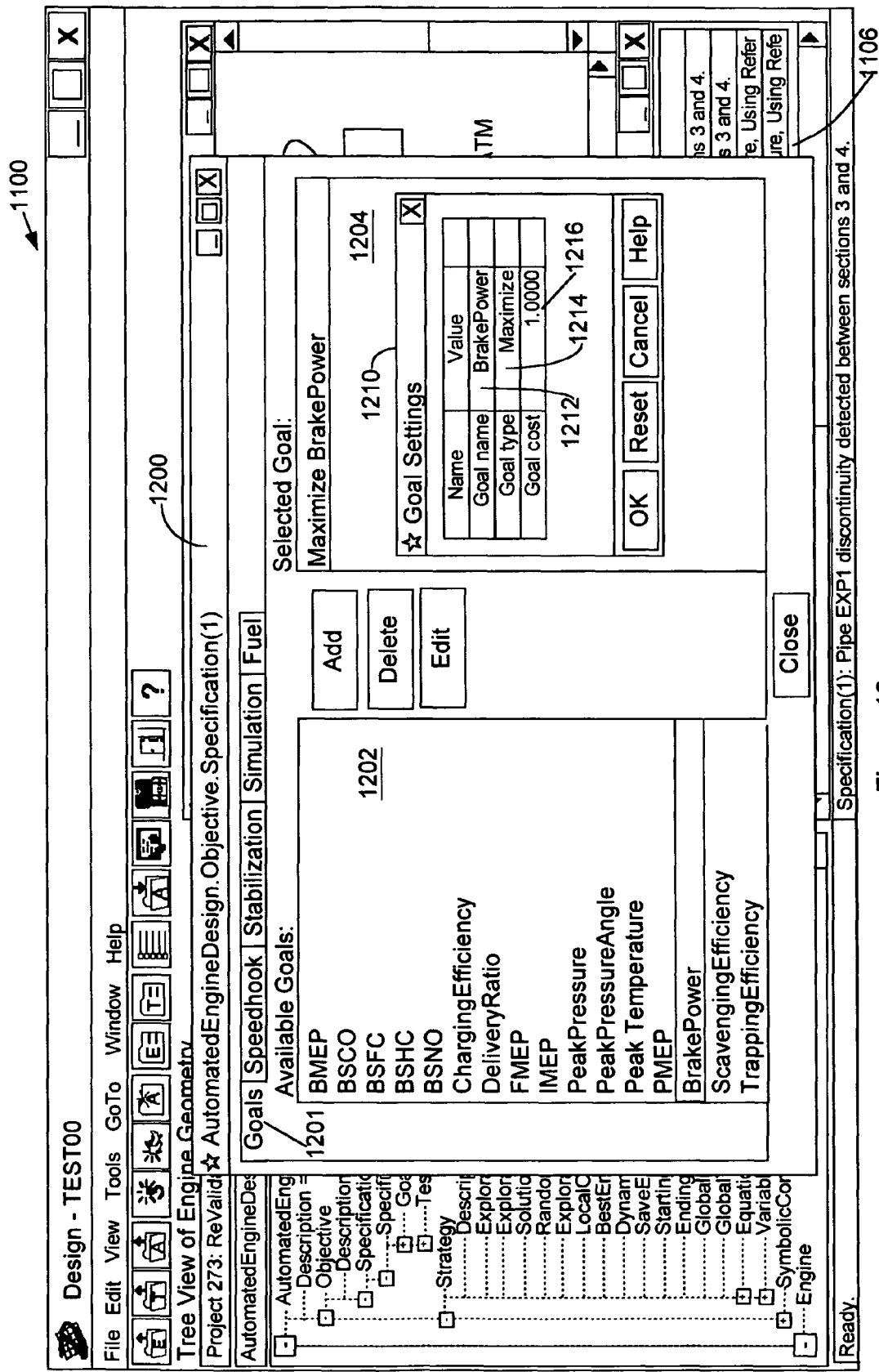
FIG. 13 illustrates the design screen and objective specification screen with the goals tab selected of FIG. 12 with an embodiment of a goal setting dialog box opened.

FIG. 13 illustrates the design screen 1100 and objective specification screen 1200 with the goals tab 1201 selected of FIG. 12 with an embodiment of a goal setting dialog box 1210 opened. The goal setting dialog box 1210 provides spaces for a user to define the goal. A goal name is specified at 1212 and matches the goal selected from the available goal window 1202. A goal type is specified at 1214 and may be, for example, maximize the value of the goal, minimize the value of the goal, or match a goal value or set of goal values. A goal cost is specified at 1216. The cost may be based on normalized values or absolute values of the goals. The goal cost is a weighting of the goal in comparison with other goals. Thus, a goal cost of 1.0 for each goal causes each goal to be equally weighted. For an application wherein fuel economy is a primary concern, for example, fuel consumption may be weighted at 2.0 and power may be weighted at 1.0. The result is that fuel consumption has twice the relative importance of power.

Figure 14:
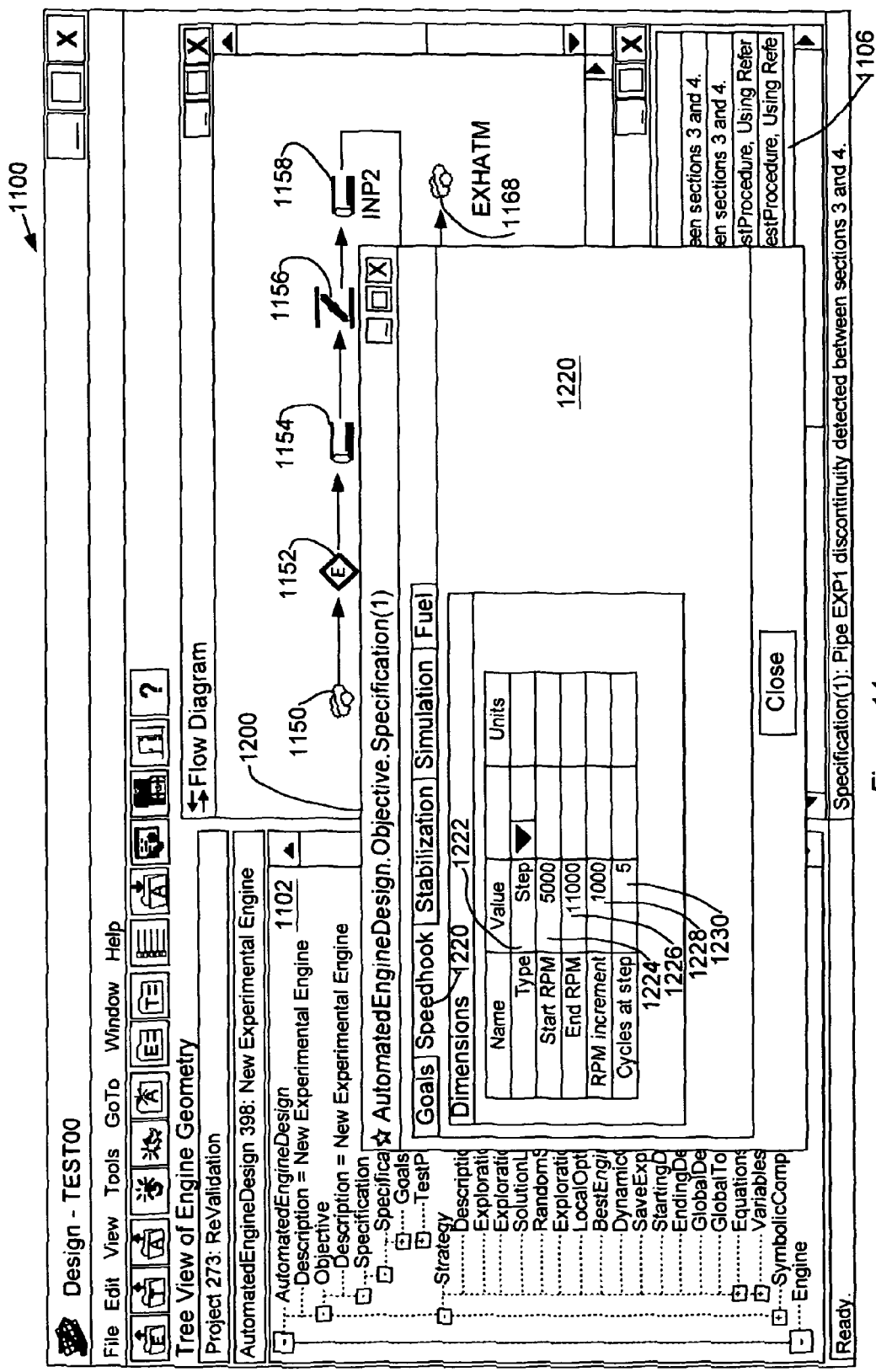
FIG. 14 illustrates the design screen of FIG. 8 having the objective specification screen opened with a speedhook tab selected.

FIG. 14 illustrates the design screen 1100 of FIG. 8 having the objective specification screen 1200 opened with a speed-hook tab 1220 selected. The objective specification screen 1200 with a speedhook tab selected 1220 provides space in which entries related to the speeds at which simulations will be performed may be entered. A type or method of moving from simulation at one RPM to simulation at another RPM is indicated at 1222. A stepwise type is selected, which causes the optimization to step from one RPM to another after simulating a number of engine cycles. At 1230, that number of cycles to be simulated in each step may be entered. The number of cycles to be simulated in each RPM step is five in the depicted example. At 1224, a simulation starting value is entered, and at 1226, a simulation ending value is entered. The starting value in the depicted example is 5000 RPM and the ending value in the depicted example is 11000 RPM. An increment of 1000 RPM has been entered at 1228. Thus, the simulation will occur at 5000 RPM and in steps of 1000 RPM to 11000 RPM.

Figure 15:
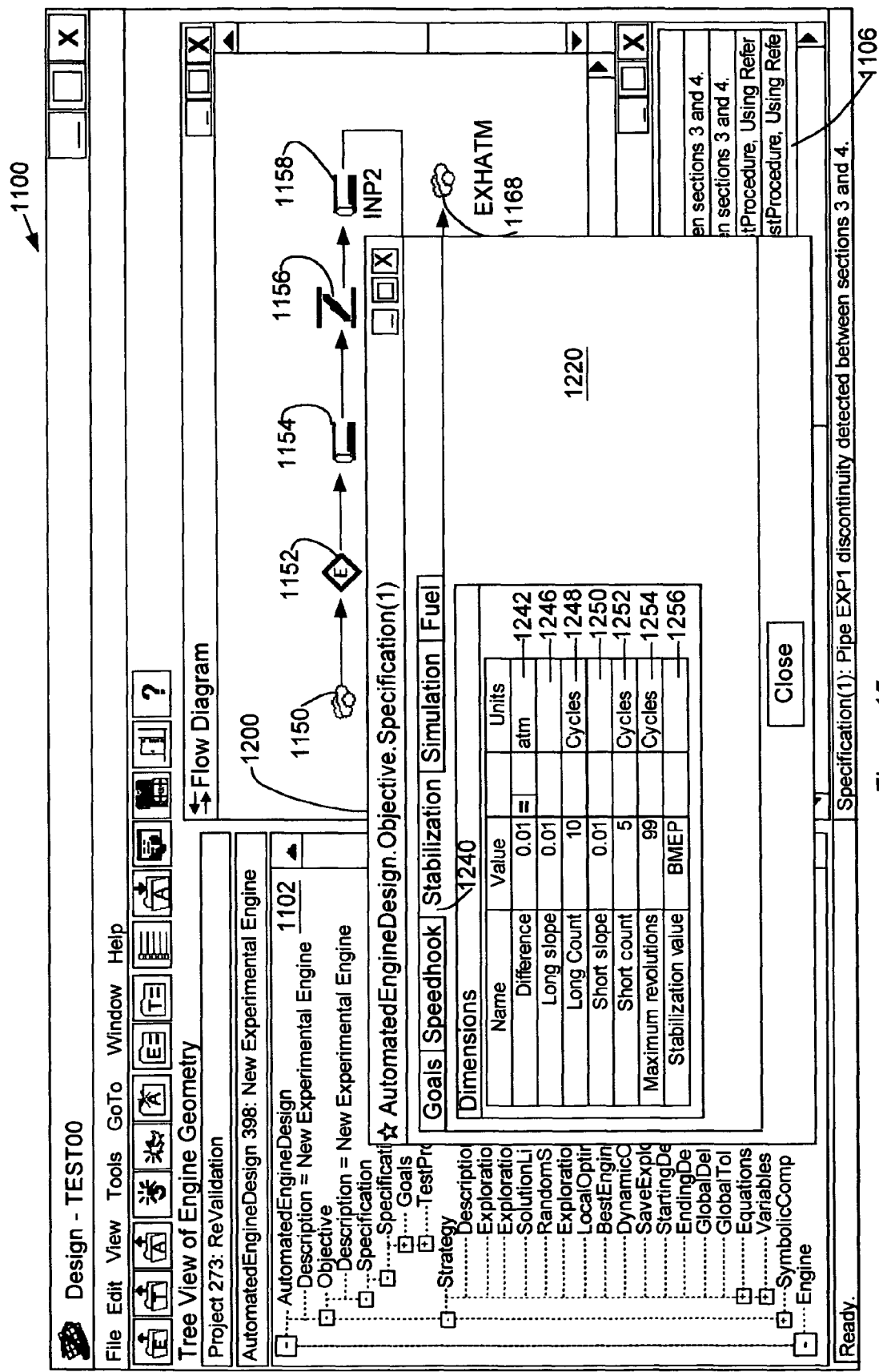
FIG. 15 illustrates the design screen of FIG. 8 having the objective specification screen opened with a stabilization tab selected.

FIG. 15 illustrates the design screen 1100 of FIG. 8 having the objective specification screen 1200 opened with a stabilization tab 1240 selected. Stabilization goes to simulating an engine, for example, through multiple rotations of the engine at a given RPM to achieve stable operation of that engine at that RPM. Stability may be measured by comparing slopes of a long line passing through the most recent simulation results to an acceptable long slope value and a short line passing through a smaller group of the most recent simulation results to an acceptable short slope value. If the slopes of those lines are acceptable, then the difference between the average value of the two lines is compared to an acceptable value for that difference. If the difference in the average value of the two lines is acceptable then the simulation has stabilized at that RPM. A Difference 1242 is a mathematical difference between a long line average value and a short line average value and may, for example, have a value of 0.01 and units of atmospheres. A Long Slope 1246 is a maximum acceptable value for the slope of a line passing through points specified in a Long Count 1248 and may, for example, have a value of 0.01. The Long Count 1248 is a number of most recent stabilization points used to compute the long slope and may, for example, have a value of 10 and units of cycles wherein cycles indicates a number of engine cycles to be simulated. A Short Slope 1250 is the maximum acceptable value for the slope of a line passing through points specified in a Short Count 1252 and may, for example, have a value of 0.01. The Short Count 1252 is a number of most recent stabilization points used to compute the short slope, is a subset of the points in the Long Count 1248 and may, for example, have a value of 5 and units of cycles wherein cycles indicates a number of engine cycles to be simulated. Maximum Revolutions 1254 is a maximum number of engine revolutions that the simulator will run, attempting to stabilize at an RPM point to be simulated. Maximum Revolutions 1254 may, for example, have a value of 99 and units of cycles wherein cycles indicates a number of engine cycles to be simulated. A Stabilization Value 1256 specifies a characteristic, the value of which is used in determining when an optimization is considered to be stabilized. The Stabilization Value 1256 may be applied to any characteristic of a base model, such as the base engine, that is to be optimized. For example, a value of BMEP may be the characteristic to which stabilization will be applied.

Figure 16:
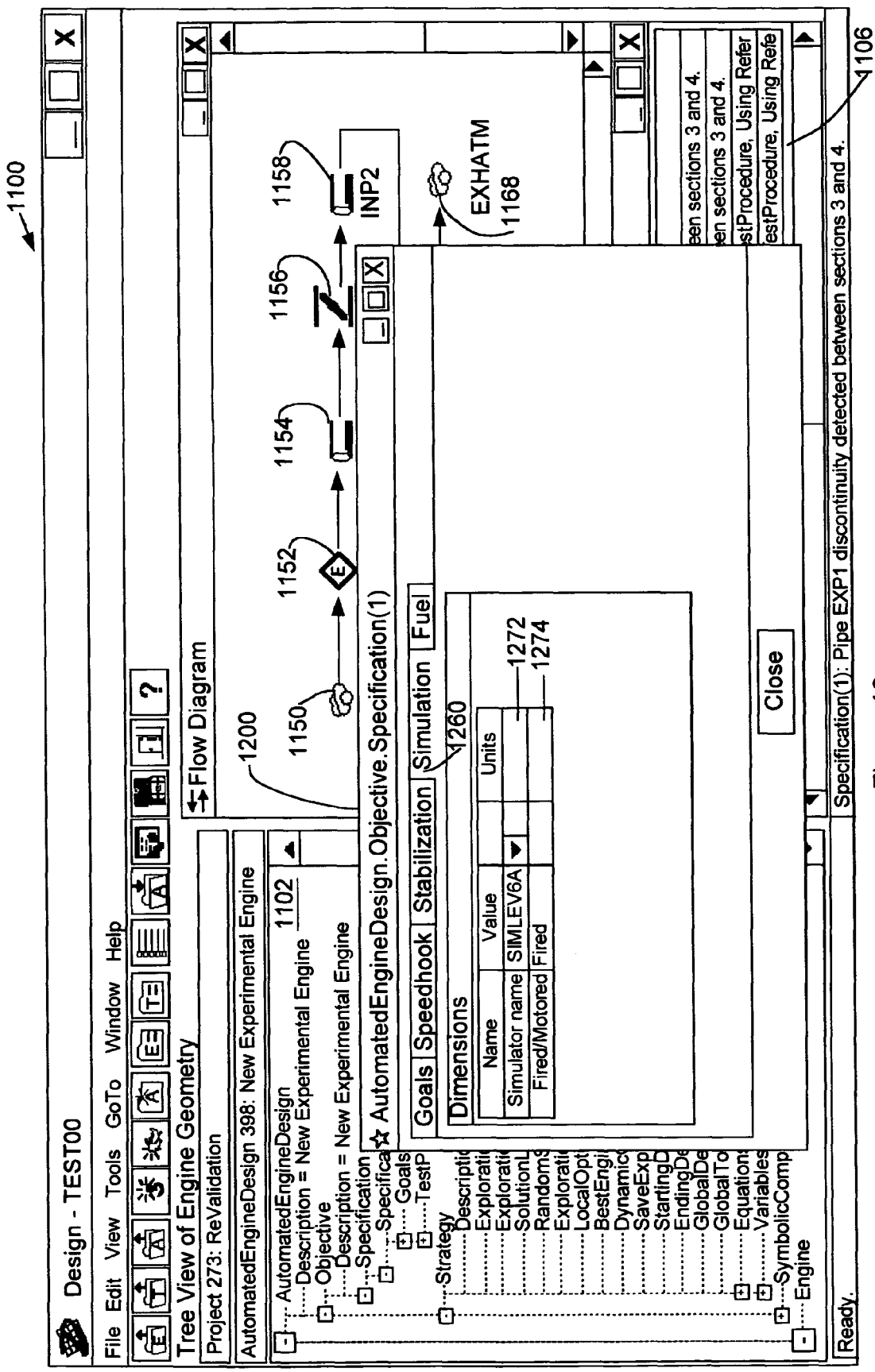
FIG. 16 illustrates the design screen of FIG. 8 having the objective specification screen opened with a simulation tab selected.

FIG. 16 illustrates the design screen 1100 of FIG. 8 having the objective specification screen 1200 opened with a simulation tab 1260 selected. The objective specification screen 1200 with the simulation tab 1260 selected provides space in which entries related to settings used by the simulator may be entered. Multiple simulators may be available for use and so the simulation tab 1260 of the objective screen 1200 provides a space in which to select the desired simulator and define aspects of that simulator. Thus, a Simulator Name field 1272 is provided for entry or selection of the simulator to be used. For example, SIMLEV6A may be entered to select a standard engine simulator having that name. Moreover, every simulator used may be retained so that results may be recreated. In addition, other fields may be provided including a Fired/Motored field 1274, which is a field in which either "Fired" may be entered indicating an engine utilizes ignited fuel or "Motored" may be entered indicating an engine in which fuel is not ignited. Other fields may also be provided under the simulation tab 1240 of the objective screen 1200 as necessary or convenient to define the simulator.

Figure 17:
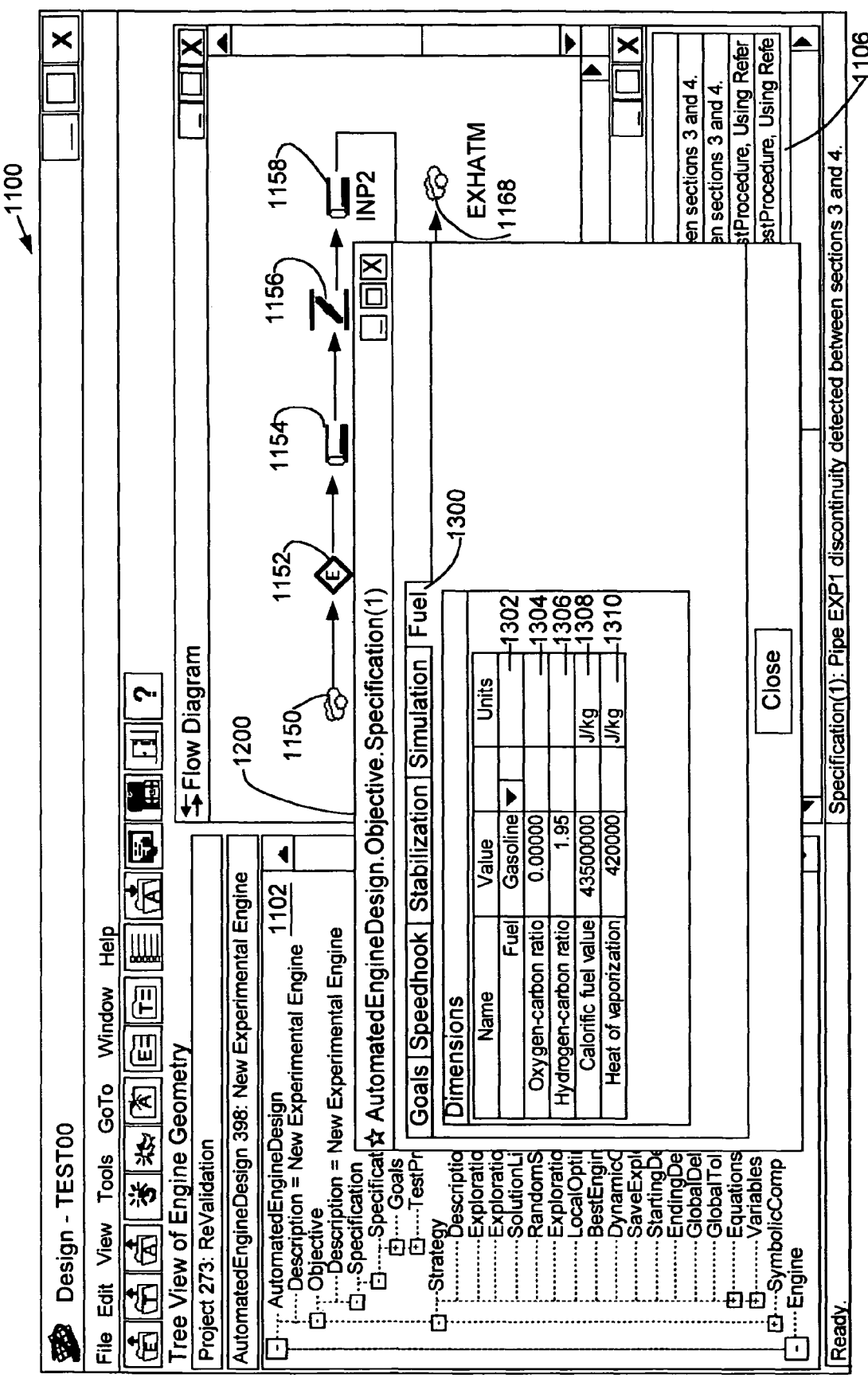
FIG. 17 illustrates the design screen of FIG. 8 having the objective specification screen opened with a fuel tab selected.

FIG. 17 illustrates the design screen 1100 of FIG. 8 having the objective specification screen 1200 opened with a fuel tab 1300 selected. The objective specification screen 1200 with the fuel tab 1300 selected provides space in which entries related to engine fueling may be entered. Fuel may be selected at 1302. The fuel selected may be, for example, gasoline or diesel. Fields 1304-1310 may be automatically filled for a standard fuel such as gasoline or diesel. If a non-standard fuel is entered at 1302, however, fields 1304-1310 may be filled manually to define the fuel. The oxygen to carbon molecular ratio (O/C) of the fuel may be entered at 1304. For example, ethanol ($C_2H_5OH$) may have an O/C ratio of 0.5. Gasoline may have an O/C ratio of 0.0. The hydrogen to carbon (H/C) ratio of the fuel may be entered at 1306. For example, octane ($C_8H_{18}$) may have an H/C ratio of 2.25. A Calorific Fuel Value for the fuel may be entered at 1308. The calorific fuel value indicates a number of calories of heat liberated when a unit mass of fuel is burned completely in a calorimeter, wherein a calorimeter is a device that measures the quantity of heat in a substance or body. The calorific fuel value for gasoline may be 43,500,000 joules per kilogram. A Heat of Vaporization may be entered at 1310. The heat of vaporization is a quantity of heat per unit mass of fuel that must be supplied to a fluid at the boiling point of the fluid to convert that fluid completely to a gas at the same temperature as the fluid. The heat of vaporization may have a value of, for example, 420,000 and units of joules per kilogram where the fuel is gasoline.

Figure 18:
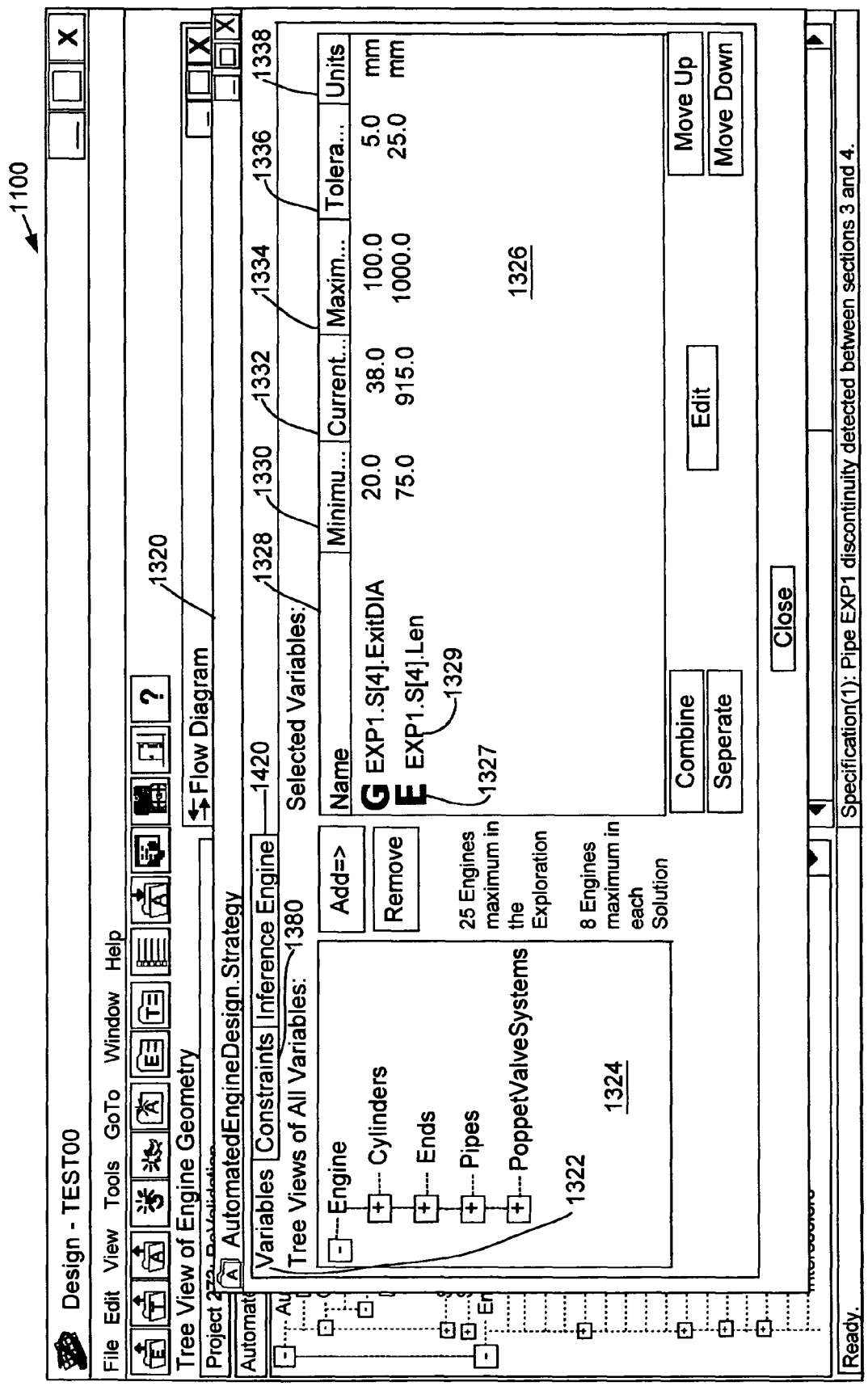
FIG. 18 illustrates the design screen of FIG. 8 having an embodiment of an automated engine design strategy screen opened.

FIG. 18 illustrates the design screen 1100 of FIG. 8 having an embodiment of an automated engine design strategy screen 1320 opened. The engine design strategy screen 1320 may be opened by right clicking a mouse when the mouse pointer is over "Strategy" in the tree view 1102 and selecting "Design" from the menu produced. The automated engine design strategy screen 1320 includes tabs for variables 1322, constraints 1380, and the inference engine 1420. The automated engine design strategy screen 1320 includes a tree view window 1324 and a selected variables window 1326 when the variables tab 1322 is selected. When the variable tab is selected, folders of strategy components that may be utilized in the current design are listed in the tree view 1324. The selected variables window 1326 contains a listing of variables selected from the tree view window for optimization. The tree view, in the illustrated example, includes strategy components categorized as cylinders, ends, pipes, and poppet valve systems that are related to engine components when selected. Each of those categories may be selected to display a listing of strategy components in each category.

Each variable in the selected variable window 1326 of the variable tab 1322 of the automated engine design strategy screen 1320 may include a group indication 1327 and a variable name 1329 in a name column 1328, a minimum value in a minimum value column 1330, a current value in a current value column 1332, a maximum value in a maximum value column 1334, a tolerance in a tolerance column 1336, and units in a units column 1338. The group indication 1327 causes variables to be used in combination during the solution phase of optimization. As many variables as desired may be grouped for such combination by, for example, listing them sequentially and providing the applicable group indication 1327 next to each variable in the group. The letter "G" indicates the first variable in a group, the letter "M" indicates one or more variables in the middle of the group, and the letter "E" indicates the last variable in the group. It should be noted that multiple groups may be defined as desired. The minimum value is the minimum value for which optimization is desired for that variable. The current is the value of the variable in the base design. The maximum value is the maximum value for which optimization is desired for that variable.

The variables included in the selected variable window 1326 in the depicted embodiment are exhaust pipe exit diameter (EXP1.S[4].ExitDia) and exhaust pipe length (EXP1.S [4].Len). The selected variable window 1326 furthermore indicates that the pipe selected will have an outlet diameter of at least 20.0 mm, a maximum diameter of 100.0 mm, and a tolerance of 5.0 mm. The selected variable window 1326 also indicates that the pipe selected will have a minimum length of 75.0 mm, a maximum length of 1000.0 mm, and a tolerance of 25.0 mm. It should also be noted that the selected variable window 1328 indicates that the pipe selected has a current diameter of 38.0 mm and a current length of 915.0 mm. Such current values may be defined in the base engine and may be, for example, dimensions for a currently used engine or values that the user wishes to use for comparison with engine design results or as the engine design progresses. Thus, a base engine configured with current values may be considered initially by the design program and other engines falling in the range defined in the selected variables window 1326 may be compared to the current engine to determine whether an improved engine design has been created and the extent of the improvement.

Figure 19:
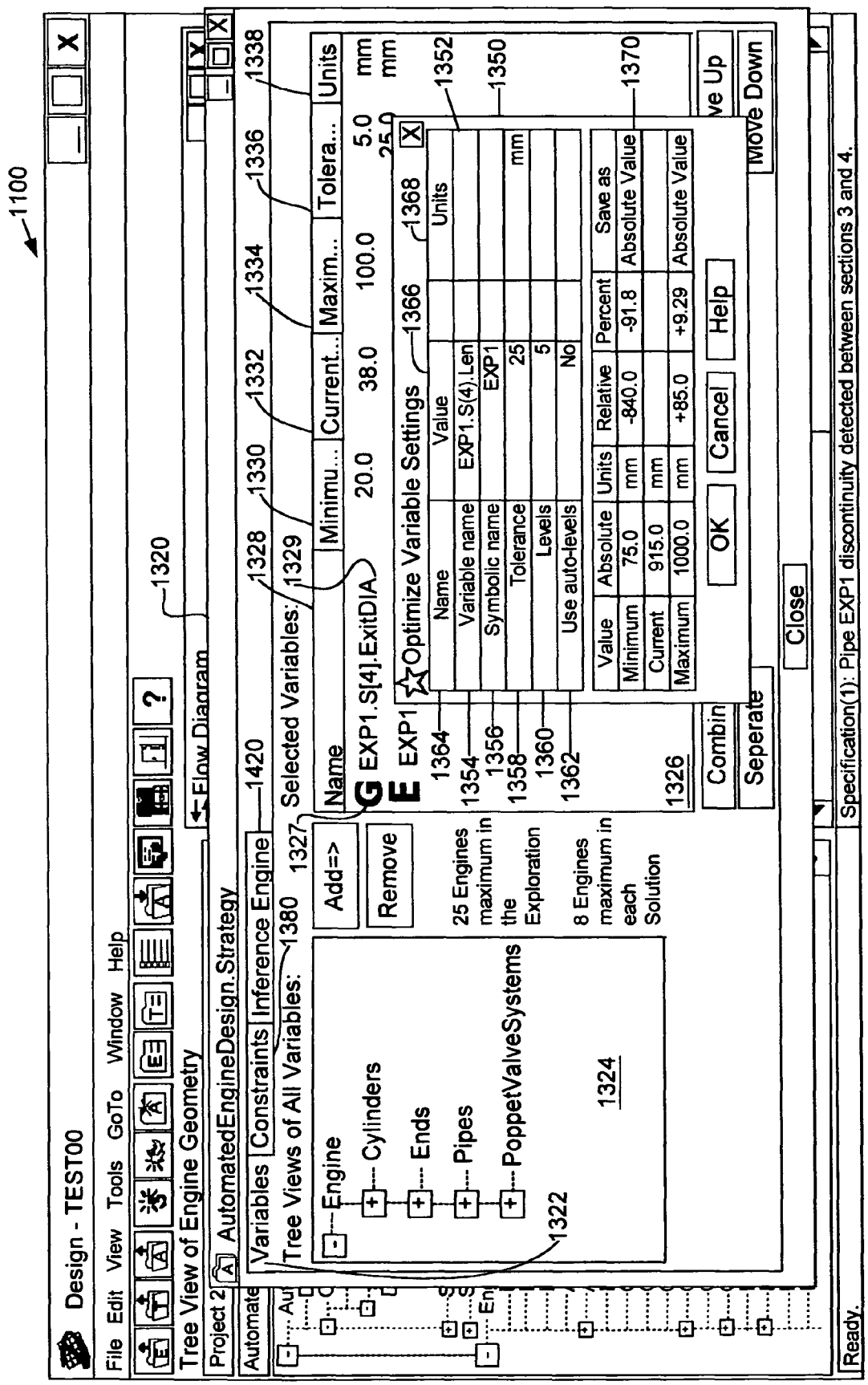
FIG. 19 illustrates the design screen of FIG. 8 having an automated engine design strategy screen opened with a variables tab selected and having an embodiment of an optimize variable settings window opened.

FIG. 19 illustrates the design screen 1100 of FIG. 8 having an automated engine design strategy screen 1320 opened with a variables tab 1322 selected and having an embodiment of an optimize variable settings window 1350 opened. The optimize variable settings window 1350 may be opened, for example, by selecting a variable and left clicking a mouse when the mouse pointer is over the "Edit" button on the engine design strategy screen 1320 with the variables tab 1322 selected. The optimize variable settings window 1350 provides spaces in which aspects of a variable may be defined. For example, an existing variable may be opened, one or more aspects may be modified and the modified variable may be saved. A general settings window 1352 includes fields for a variable name at 1354, a symbolic name at 1356, a tolerance at 1358, levels at 1360 and use of auto-levels at 1362 of a name column 1364. Values for the aspects included in the name column 1364 may be defined in a value column 1366 and units for the aspects included in the name column 1364 may be defined in a units column 1368. In the example illustrated in FIG. 19, the settings utilized to define the variable include a variable name of EXP1.S[4].Len, a symbolic name of EXP1, a tolerance of 25.0 in units of mm, levels of 5, and no use of auto-levels.

A range window 1370 in the optimize variable settings window 1350 provides fields wherein minimum, current, and maximum values for the variable may be defined. Values in the range window 1370 may be defined as absolute values, relative values, or percentage values and may be identified with appropriate units.

Thus, for example, if the current value is 915.0 mm and the minimum is expressed as −50%, then the minimum value will be 50% of 915.0 mm, or 457.5 mm. If the current value is 915.0 mm and the maximum is defined as +50%, then the maximum value will be 150% of 915.0 mm, or 1372.5 mm. Those minimum and maximum values may then be rounded to a multiple of the tolerance added to the tolerance starting point. The tolerance is 25 mm, and the tolerance starting point is 0, therefore the minimum may be rounded to 475.0 mm. The tolerance starting point may be calculated in many ways and may, for example, be the current value so that tolerance multiples are subtracted from the current value down to the minimum value and tolerance multiples are added to the current value up to the maximum value.

Figure 20:
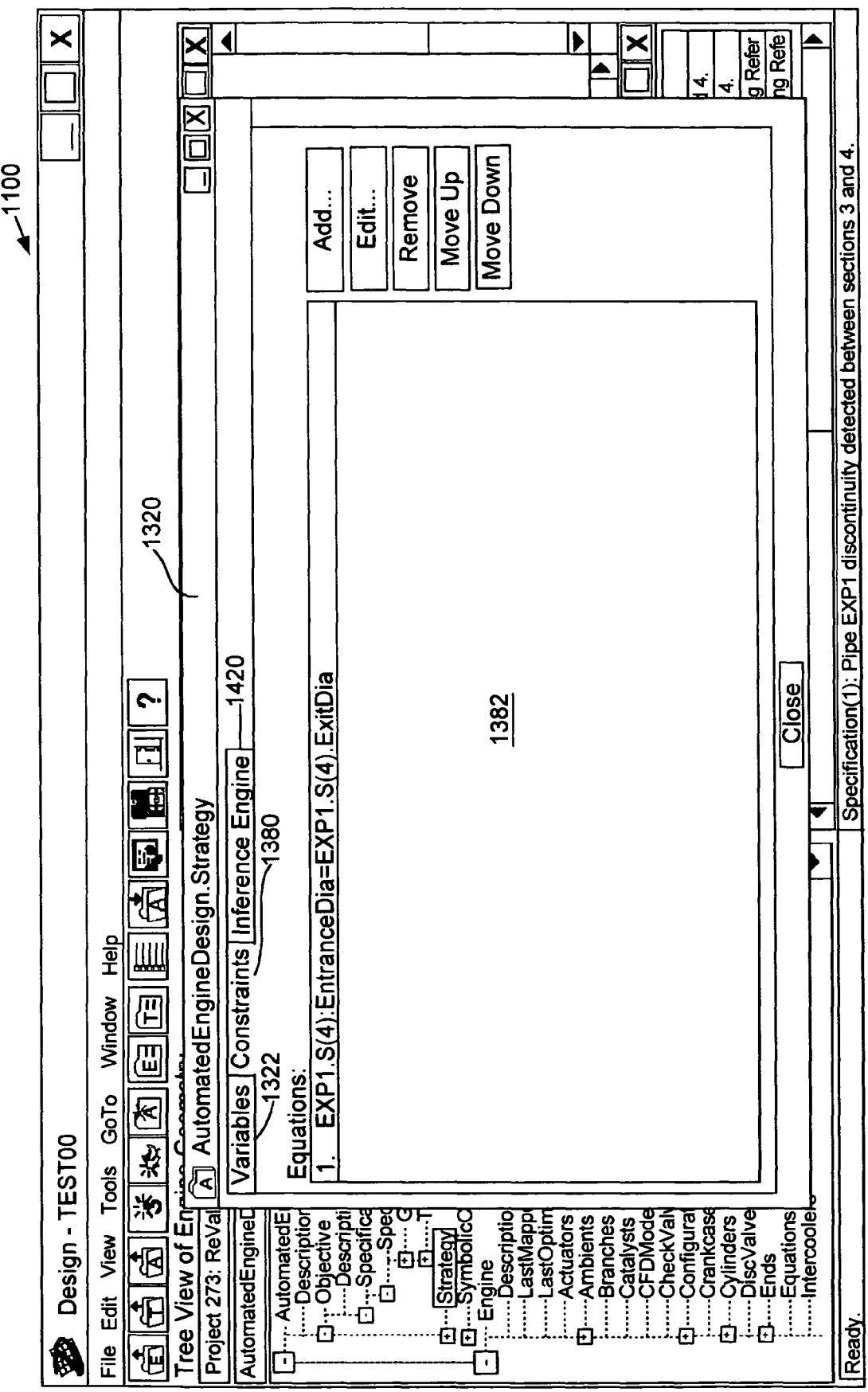
FIG. 20 illustrates the design screen of FIG. 8 having an automated engine design strategy screen opened with the constraints tab selected.

FIG. 20 illustrates the design screen 1100 of FIG. 8 having an automated engine design strategy screen 1320 opened with the constraints tab 1380 selected. Equations utilized to vary attributes of the design to be simulated with other attributes or variables are listed in the constraints window 1382 of the automated engine design strategy screen 1320 when the constraints tab 1380 is selected.

Figure 21:
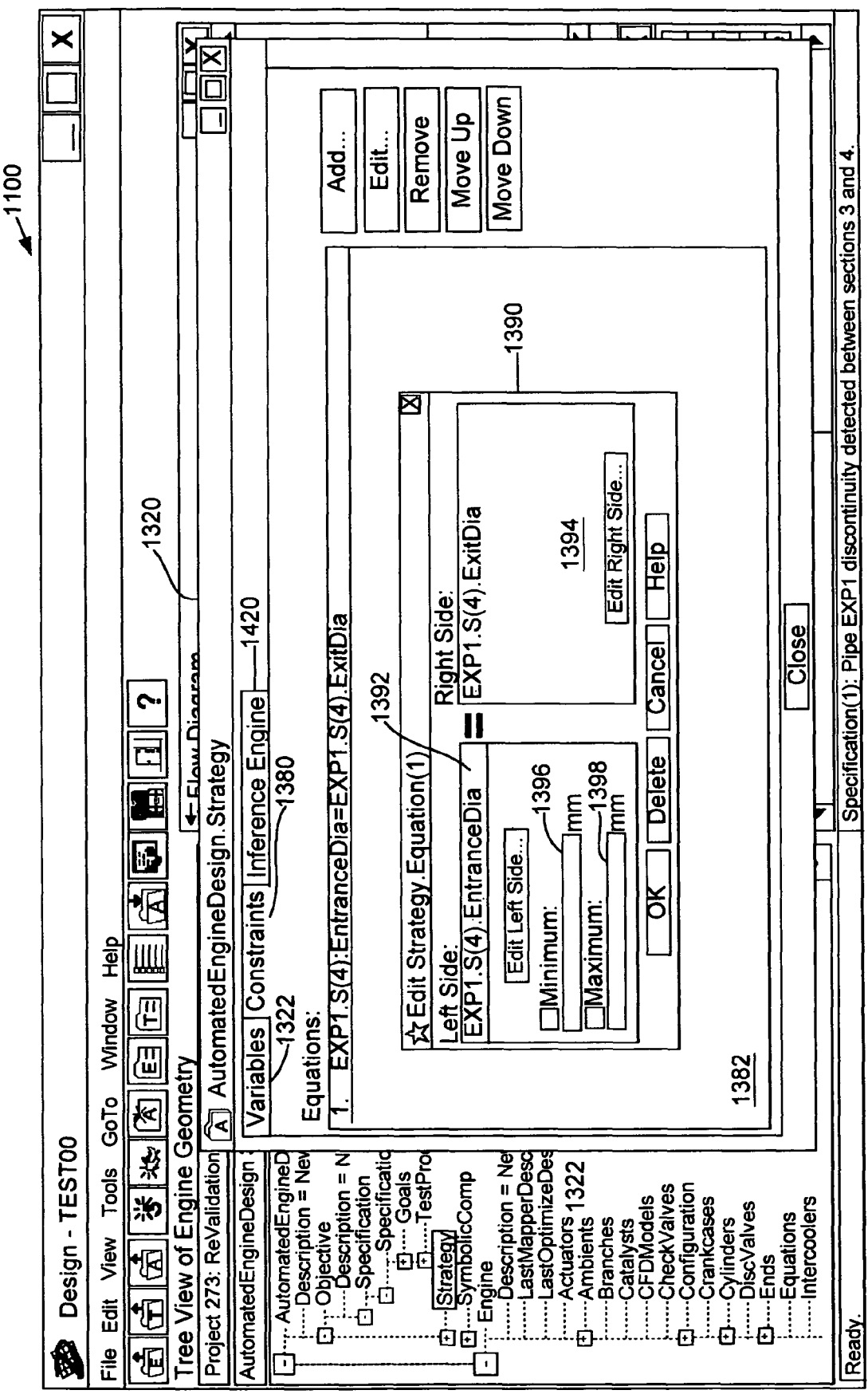
FIG. 21 illustrates the automated engine design strategy screen with the constraints tab selected of FIG. 20 having an embodiment of an edit strategy equation screen opened.

FIG. 21 illustrates the automated engine design strategy screen 1320 with the constraints tab 1380 selected of FIG. 20 having an embodiment of an edit strategy equation screen 1390 opened. The edit strategy equation screen 1390 provides spaces in which aspects of a constraints equation may be displayed or modified. In the example depicted, "EXP1.S(4) EntranceDia" is the constraint selected in the automated engine design strategy window 1380, therefore, detailed information about the selected constrain "EXP1.S(4)EntranceDia" is listed in the edit strategy equation screen 1390. The selected constraint is an entrance diameter of an exhaust pipe, and the name of that constraint (EXP1.S(4).EntranceDia) has been entered on the left side 1392 of the edit strategy equation screen 1390. The exhaust pipe entrance diameter is equated to an exit diameter of the same exhaust pipe (EXP1.S (4).ExitDia), which has been entered on the right side 1394 of the edit strategy equation screen 1390. That equation causes the optimization to generate only engine configurations having a constant diameter exhaust pipe with equal entrance and exit diameters. Where a minimum value for the attribute being calculated by the equation is desired, such a minimum value may be entered in the minimum value dialog box 1396. Similarly, where a maximum value for the attribute being calculated by the equation is desired, such a maximum value may be entered in the maximum value dialog box 1398.

Figure 22:
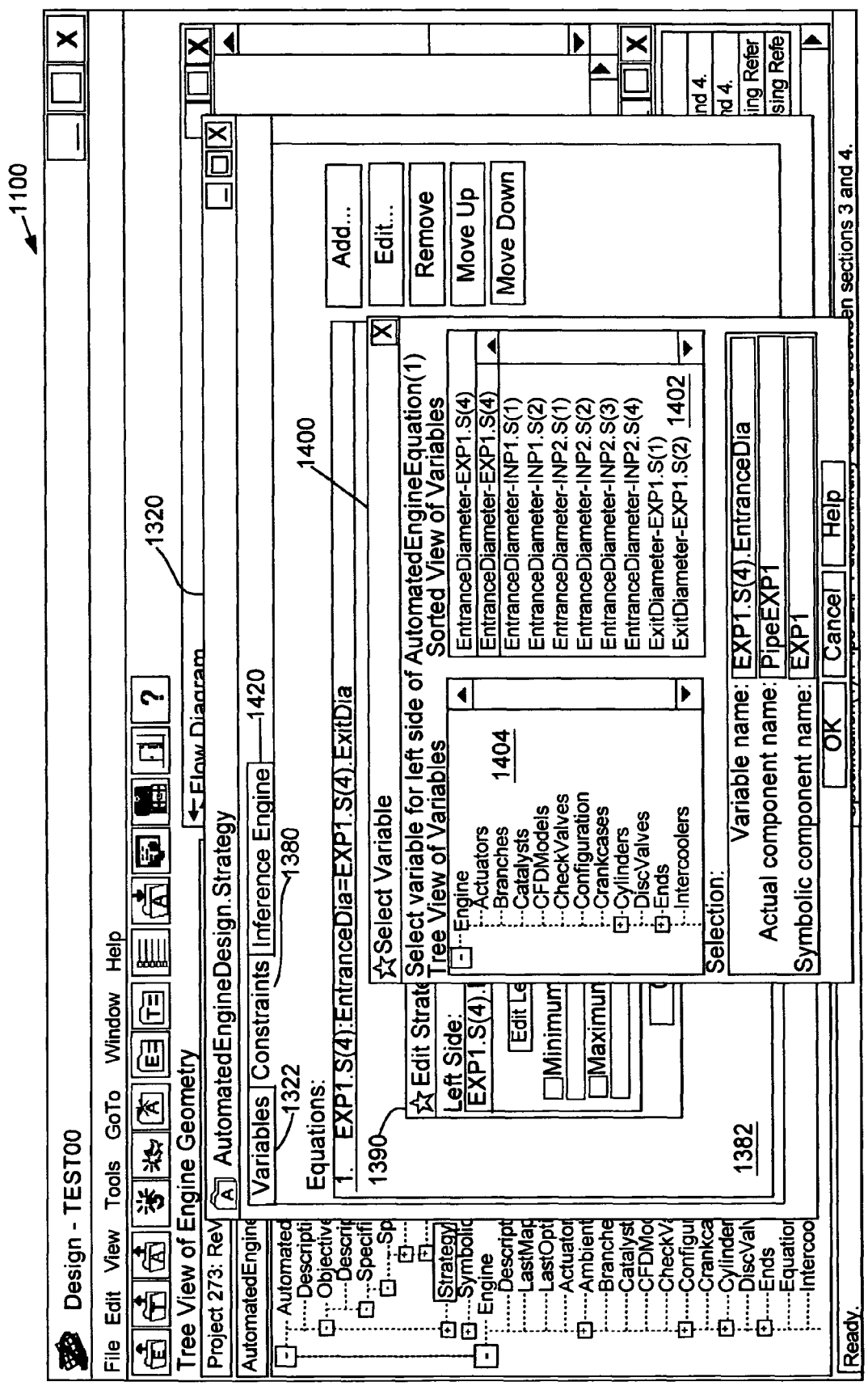
FIG. 22 illustrates an embodiment of a select variable screen with the constraints tab selected.

FIG. 22 illustrates an embodiment of a select variable screen 1400 that may be opened by selecting the "Edit Left Side" button on the automated engine design strategy screen 1320 with the constraints tab 1380 selected. The select variable screen 1400 provides an attribute listing 1402 selected from a tree view 1404. The attribute desired to be defined by a constraint equation may thus be selected from the attribute listing 1402. An attribute to be utilized on the left side of the edit strategy equation screen 1390 may be selected from a select variable screen similar to the select variable screen 1400 illustrated in FIG. 22.

Figure 23:
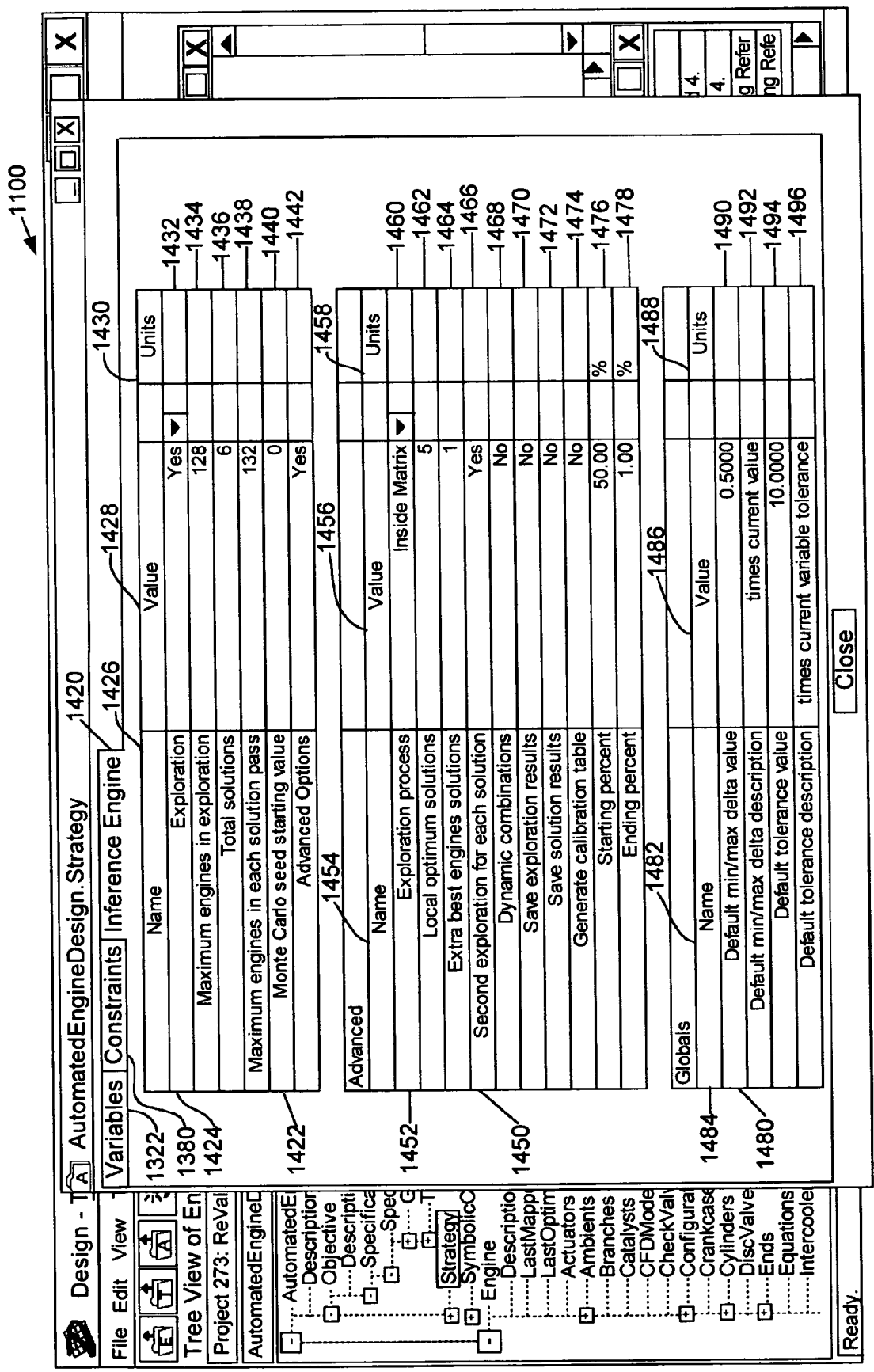
FIG. 23 illustrates the design screen of FIG. 8 having the automated engine design strategy screen opened with an inference engine tab selected.

FIG. 23 illustrates the design screen 1100 of FIG. 8 having the automated engine design strategy screen 1320 opened with an inference engine tab 1420 selected. Basic inference engine design strategy information is displayed in a basic inference engine design strategy window 1422. The basic inference engine design strategy window 1422 includes a listing of basic inference engine factors 1424 in a name column 1426. Each basic inference engine factor 1424 may include a value that may be entered in a value column 1428 and units that may be entered in a units column 1430. The basic inference engine factors 1424 include a binary selection as to whether exploration is desired at 1432, a maximum number of engines to be simulated during exploration at 1434, a total number of solutions desired at 1436, a maximum number of engines to be simulated in each pass at 1438, a seed for a random number generator at 1440, and a binary selection as to whether advanced options are desired at 1442.

The exploration phase of optimization, in which more than one starting point may be selected as beginning points from which to search for optimal solutions, may be enabled or disabled. If exploration is not desired, a single search will take place for an optimal solution. Viewing solutions within a design space topographically, often there are multiple peaks separated by valleys. Therefore, a danger of not utilizing exploration is that the solution will approach a peak that does not include the optimal solution. By utilizing exploration and beginning the optimization process from more than one point in the design space the likelihood of finding the optimal solution is increased.

Where exploration is used to simulate engines beginning at more than one point in the design space, a number of starting points to be selected in the design space may be entered next to the number of engines to be simulated. A total number of solutions desired may be entered next to total solutions. A number of engines to be simulated from each of those beginning points may be specified by entering that desired number of engines next to the engines in each solution pass.

The number of engines to be simulated may be limited for practical purposes. Without use of a tolerance, an infinite number of engines to be simulated would exist in any design space. By utilizing tolerances, infinitely small steps in the design space are eliminated and a finite number of simulations is forced to exist in the design space. Even utilizing tolerances, however, the number of potential solutions in a design space may be great. Thus, it is desirable in certain circumstances to further reduce the number of potential solutions to be simulated. Where it is desired that only a portion of the potential solutions be simulated, potential solutions to be simulated may be chosen randomly. For example, random engines may be selected by applying a Monte Carlo selection based on a seed. Use of a seed permits repeatability from one optimization to another as is known to those skilled in the area of statistical processes.

Only the values in the basic inference engine design strategy window 1422 need be entered by a user. All other information necessary to define how optimization will be conducted within the design space defined under the variables tab 1322 of the automated engine design strategy screen 1320 will be inferred by the inference engine if only the basic inference engine design strategy window 1422 is completed. Alternately the advanced options window 1450 and/or the global options window 1480 may be completed where the user wants additional control over how optimization will be performed within the design space.

FIG. 23 also illustrates an embodiment of an advanced options window 1450. Use of advanced options, which may be defined in the advanced options window 1450, may permit a type of exploration process to be utilized. Advanced inference engine information is included in a list of advanced inference engine factors 1452 included in a name column 1454. Each advanced inference engine factor 1452 may include a value that may be entered in a value column 1456 and units that may be entered in a units column 1458. The advanced inference engine factors 1452 include a desired exploration process at 1460. The desired exploration process may include, for example, inside matrix or full matrix, which may be selected from a drop-down box. Inside matrix indicates that points lying inside the border of the design space are to be utilized while full matrix indicates that points lying both on the border and inside the border of the design matrix are to be used in exploration.

The number of total solutions at which the optimization is desired to arrive may include best design solutions and local optimum solutions. Best design solutions are the best found overall from all exploration beginning points. Local optimum solutions are solutions found from exploration beginning points other than the exploration beginning point resulting in the optimum solution. Providing solutions from different exploration beginning points (local optimums) provides comparison within the design space where multiple peaks exist in the design space when viewed topographically. As previously discussed, an example of a benefit derived from uncovering local optimums is that a less than optimal solution may be more desirable than an optimal solution where, for example, the local optimum solution approaches the optimal solution and the local optimum solution is less expensive to build because, for example, it requires fewer changes from a current design. Thus, a number of local optimum solutions desired may be entered at 1462 and a number of best designs desired may be entered at 1464.

At 1466, a binary indication as to whether a second exploration is desired for each solution may be displayed. A second exploration for each solution indicates that another exploration is desired because, for example, a large number of variables are being optimized such that the number of levels for each variable has been limited, for practical purposes, to a value of two. Thus, a second exploration pass may be performed to select additional exploration points. Additional exploration passes may be performed when desired.

At 1468, a binary indication as to whether dynamic combinations are desired may be displayed. At 1470, a binary indication as to whether exploration results should be saved may be displayed. Exploration results are the results of design configurations simulated during exploration. At 1472, a binary indication as to whether solution results are to be saved may be displayed. Solution results are the results of simulation of the best designs and the local optimums. At 1474, a binary indication as to whether to generate a calibration table may be made. A calibration table is a table of optimum values associated with specified RPMs. For example, optimization for an engine may be specified to occur at regular RPM steps throughout an RPM range and the optimum value associated with each specified RPM may be desired. The calibration table may provide that information.

At 1476, a starting percentage for purpose of the portion of a step to be simulated on one or more initial passes is entered and at 1478, an ending percentage for purpose of the portion of a step to be simulated on one or more last passes is entered.

FIG. 23 also includes a global options window 1480. The global options window 1480 includes a name column 1482 containing a listing of global factors 1484, a value column 1486 containing characters related to the global factors 1484 and a units column 1488 containing units related to the global factors where appropriate.

At 1490, a default min/max delta value is entered, and at 1492, a default min/max delta description is entered. The default min/max delta value may include a multiplier that is multiplied by the current value and subtracted from the current value to arrive at a minimum value and added to the current value to arrive at a maximum value when the default min/max delta description is "times current variable value." Other default min/max options may include "times current variable tolerance."

At 1494, a default tolerance value is entered, and at 1496, a default tolerance description is entered. The default tolerance value may include a multiplier that is multiplied by the default internal tolerance to arrive at a default tolerance when the default tolerance description is "times current variable tolerance." Other default tolerance options may include "times current variable value."

It should be noted that design strategy information may be defined and reused without the necessity of reconsidering and reassigning that information. For example, once it has been determined, possibly through experimentation or experience in using the system, that a strategy is appropriate for use in certain situations, that strategy may be approved for use in those situations. Thus, experience may be retained in the system and lower level designers that may not have the experience to set-up the strategy, may nonetheless participate in design by capitalizing on the experience of others.

Figure 24:
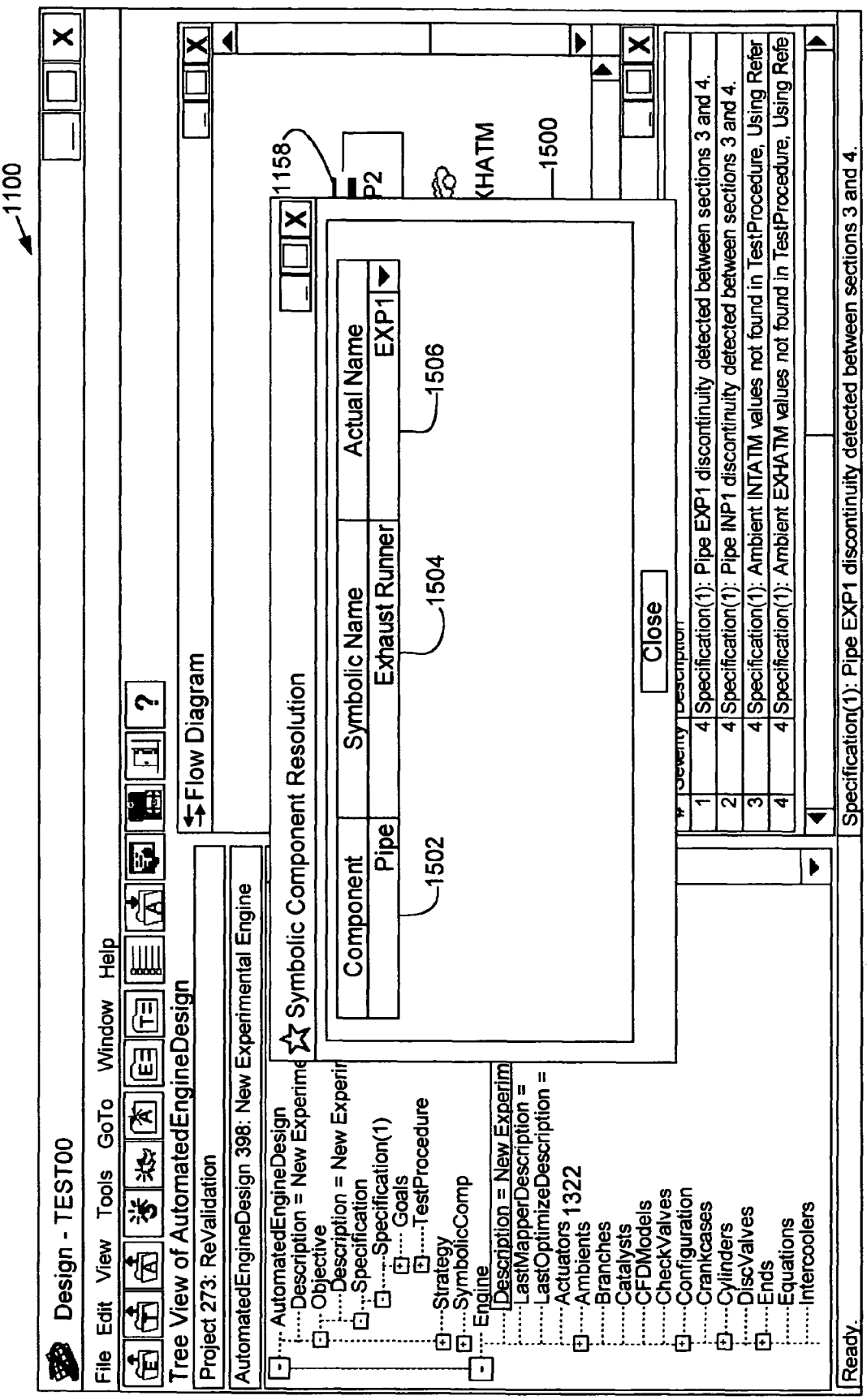
FIG. 24 illustrates the design screen of FIG. 8 with an embodiment of a symbolic component resolution screen opened.

FIG. 24 illustrates the design screen 1100 of FIG. 8 with an embodiment of a symbolic component resolution screen 1500 opened. The symbolic component resolution screen 1500 may be opened from the design screen 1100 by selecting "Symbolic Components" in the tree view 1102 and selecting "Design" from the menu produced. The symbolic component resolution screen 1500 provides an area from which one or more strategy attributes may be related to one or more base design attributes. The symbolic variable depicted in FIG. 24 is a component definition and, in particular, defines an exhaust pipe. As may be seen in symbolic component resolution screen 1500, the symbolic variable component 1502 is a pipe, the symbolic name 1504 is "EXHAUST RUNNER" and the actual name 1506 of the engine variable is EXP1. That causes strategy attributes associated with the symbolic name "EXHAUST RUNNER" to be applied to the engine component "EXP1" under the component "Pipe."

An expert system may include many component parts that may vary depending on the function to be performed by the expert system. At its most basic, a typical expert system may include a knowledgebase, an inference engine, and a user interface. The knowledgebase may contain information that is the accumulation of the training provided to the expert system. The inference engine may include a set of instructions or rules that acts upon information typically contained within the knowledgebase to, for example, create an optimized design. The user interface typically permits a user to input information and instructions into the expert system (i.e., train the system) and provides results of operation of the expert system to the user. An expert system that is intended to create designs for mechanical or other devices would also typically include a simulator that permits a computer to simulate the operation of the device.

The present expert system may include a repository of information or knowledge and can also perform operations on that knowledge. The expert system is typically a computer based system having a processor for performing computations and a database structure whereby information comprising the knowledgebase is stored in a storage device. The expert system may be analogized with a human expert as it requires training, stores information it learns in memory or a storage device, and combines that learned information with computer processor intelligence to provide desired results. The expert system, however, provides the additional advantage of providing a way to leverage the abilities of one or more human experts.

The expert system may be trained by providing its knowledgebase with information related to one or more processes, devices, or systems on which the expert system is to operate. In the example wherein engines are to be designed by the expert system, that information may relate to one or more engines and related components.

The expert system may also be trained by providing its knowledgebase with information related to the operation and interaction of those processes, devices, or systems. In the example wherein engines are to be designed by the expert system, that operational and interactive information may take the form of one or more simulators that contain instructions that relay to the expert system how an engine having various components would perform when those components are combined at various levels of engine operation.

The expert system may also be trained by providing its knowledgebase with information related to objectives that are desired to be accomplished by the expert system and rules for evaluating each design. That objective information would typically be related to variations in the processes, devices, or systems that may be implemented in a search for a process, device, or system that provides a desired result or performance. In the example wherein engines are to be designed, that objective information may take the form of one or more test procedures and one or more specifications that define one or more goals. Desired variation of one or more variable components within desired ranges at desired tolerance steps to identify components that will in combination, most closely achieve the desired operation may be defined in a strategy. The objective may also include a method by which results are quantified to be compared to the goals.

The process, device, or system information, the operation and interaction information, the objective information and any other information stored in the expert system may be referred to in combination as a knowledgebase.

The expert system as it exists prior to having its knowledgebase populated with information may be referred to as a "framework." That framework may include one or more inference engines that include instructions regarding how rules are to be applied to information to be provided from the knowledgebase and one or more simulators, along with hardware such as processors, memory, data storage facilities, and user interface hardware. The knowledgebase is then the accumulated information on which the framework may operate. The information that comprises the knowledgebase may be input by a human that we will refer to as a knowledge engineer and may also be created and accumulated by operation of the expert system. Because the expert system operates utilizing its knowledgebase, where some or all of that knowledgebase has been input by a knowledge engineer the results achieved by the expert system will tend to vary depending on the information placed in the knowledgebase by the knowledge engineer. Thus, when a common expert system framework is implemented by different knowledge engineers, different information may be placed in the knowledgebases and varying results may be achieved by those implementations of the expert system.

It should furthermore be recognized that an expert system that has accumulated expert knowledge may be operated by a person who is less than expert and still provide the same expert results that would be achieved if an expert such as a knowledge engineer operated the expert system. For example, a knowledge engineer may operate the expert system utilizing the information that he input into the knowledgebase to assure that information provides the desired results. Where appropriate the information may further be grouped by the knowledge engineer such that information related to a particular device, procedure, or system is grouped in an application specific project. Non-experts, such as application engineers may then utilize the information in a project to create one or more designs that are the same as designs that would be created by the knowledge engineer. Thus, the knowledge of the knowledge engineer may be leveraged by deploying that knowledge throughout an organization for use by experts and non-experts alike through use of the expert system.

Moreover, a person who is knowledgeable about, for example, market demands to a greater extent than a knowledge engineer, may utilize the knowledge of the knowledge engineer that is included in the expert system to create optimum solutions that meet market demands. Thus, the expert system may solve problems or create designs that would otherwise require time consuming cross-training between multiple humans.

Utilizing an expert system that optimizes an engine and related components for use in a motor vehicle as an example, engine system components that are not to be changed, because for example the cost of altering those components is too great, may be defined in an engine definition. Components of the engine system that may be varied may be referred to as variables and may be defined in the expert system. Limitations on the magnitude of the variation of those variables may also be provided in the expert system. Test procedures may be defined in the objective portion of the expert system to describe in computer simulation terms the manner in which the engine and components are to be tested or simulated.

The engine design expert system may be arranged to facilitate non-design expert use of the system. For example, the engine design expert system may be arranged in projects with each project corresponding to a base type of engine. A project may then include various definitions of components having fixed or variable values, also called "engine definitions," test procedures, and sub-knowledgebases, which are discussed further in connection with FIG. 25. A knowledge engineer may create projects such that they include only definitions that are known to create desirable designs of that engine. An application engineer may then utilize the definitions included within the project to create new designs of that engine utilizing the expert system that are the same designs the knowledge engineer would create utilizing the expert system because those designs use the same information that would be used by the knowledge engineer. Those new designs may be varied and may optimize, for example, fuel efficiency, power, or emissions of the engine or match particularly desired engine function characteristics. The application engineer may also simulate already designed engine systems to, for example, verify operation at various engine speeds and thereby confirm that those designs are appropriate at all engine speeds.

The expert system also provides quality assurance of designs because control is placed on the parameters within which an application engineer can make modifications.

An application specific interface may be provided as a portion of the expert system that may be utilized by application engineers or other users. The application specific interface may permit those application engineers to access projects that have system definitions created and approved by experts and utilize those definitions to create optimum designs.

Thus, the application specific interface provides a facility that is easy to use and delivers a result that is equivalent to a result that the knowledge engineer would provide. That, in return, frees the knowledge engineers to focus on other designs while application engineers, marketing personnel, or others, create designs without necessitating involvement by the knowledge engineer.

Figure 25:
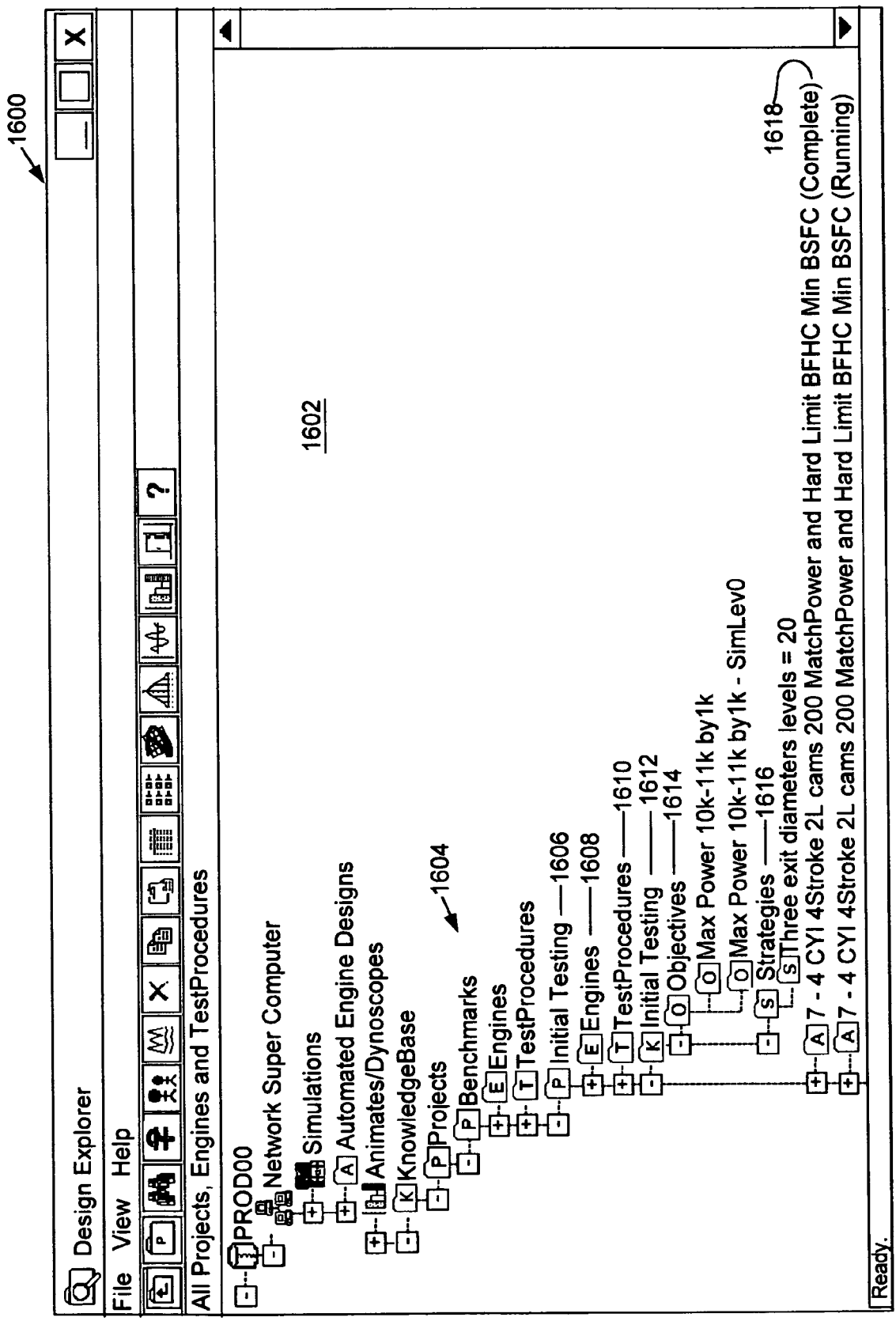
FIG. 25 illustrates an embodiment of an automated engine design expert system screen.

FIG. 25 illustrates a user tree view 1602 of an embodiment of automated engine design expert system screen 1600. The user tree view 1602 permits access to the entire expert system so that the expert system may be modified by the knowledge engineer. As may be seen at 1604, one or more projects may be created within the expert system. A project entitled "Initial Testing" 1606 is included as an application specific interface project. Within that application specific interface project 1606 there are one or more engine definitions in an engine file 1608, one or more test procedures in a test procedure file 1610, and one or more sub-knowledgebases 1612. Each sub-knowledgebase 1612 may contain an objectives folder 1614 with one or more objectives, a strategies folder 1616 with one or more strategies, and one or more automated engine designs 1618. The automated engine designs 1618 may include a particular engine, a particular test procedure, a particular objective, and one or more strategies, all of which may have been selected from the project by an application engineer to be utilized in, for example, an optimization.

Figure 26:
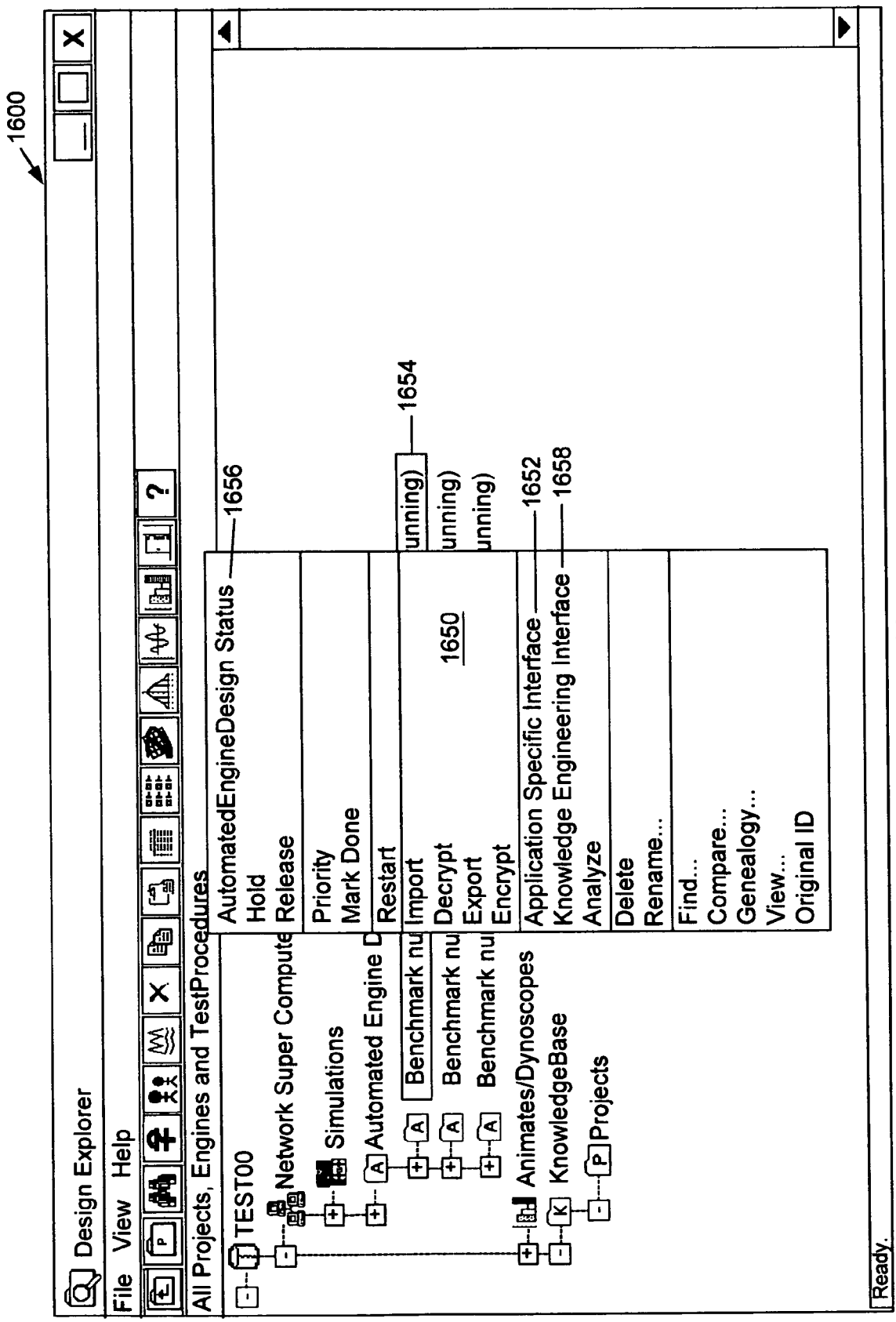
FIG. 26 illustrates the selection of an automated engine design from the engine design expert system screen.

FIG. 26 illustrates the selection of an automated engine design from the engine design expert system screen 1600 to produce a drop down menu 1650 that may be utilized to access an application specific interface by selecting the application specific interface item 1652 from the drop down menu 1650.

In addition, a management interface (not illustrated) may be accessed by selecting the AutomatedEngineDesign Status item 1656 from the menu 1650.

Also, a knowledge engineering interface (not illustrated) may be accessed by selecting the Knowledge Engineering Interface item 1658 from the menu 1650.

Figure 27:
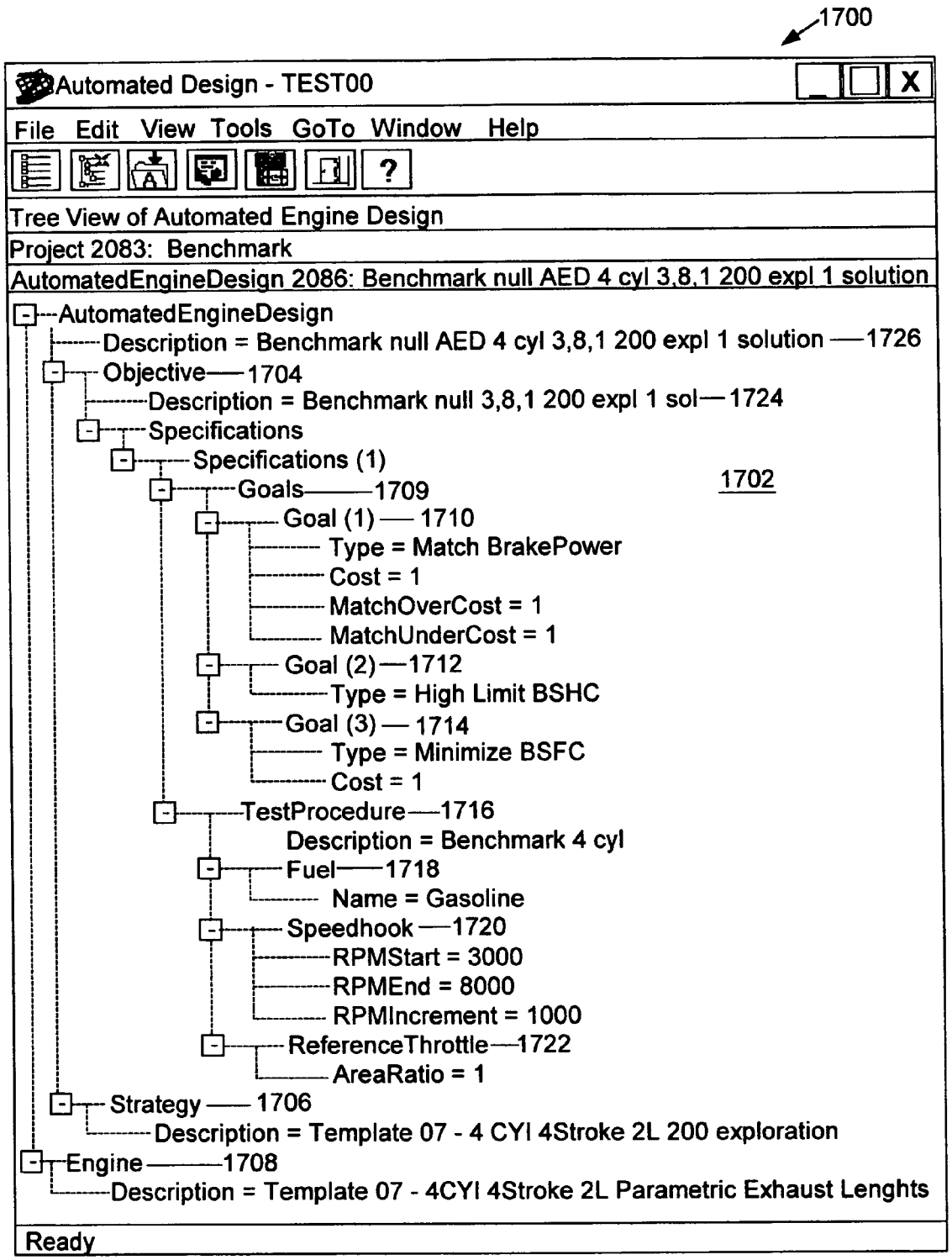
FIG. 27 illustrates an embodiment of an application specific interface screen.

FIG. 27 illustrates an embodiment of an application specific interface screen 1700 for a particular project. The application specific interface screen 1700 includes an application specific interface tree view 1702. While the information required to define and optimize the engine to be designed in that view 1702 may be extensive, possibly including thousands of engine characteristics and rules for simulation and optimization, the tree view 1702 permits modification of only a limited number of those characteristics and rules. The limitation of the items available in the application specific interface screen 1700 may have been determined by a knowledge engineer to limit the ability of an application engineer using the screen to make modifications to the characteristics and rules, as the application engineer or other user of the application specific interface screen 1700 would be unable to modify any information that is not accessible.

As may be typical, the application specific interface screen 1700 displays extensive objective information so that the application engineer using that screen can extensively modify objectives 1704 of the design. The application specific interface screen 1700, however, simply lists the strategy 1706 that will be used during a simulation and the engine definition 1708 that will be used during a simulation without permitting the application engineer to make any modifications to those aspects of the design. By permitting the application engineer to extensively access and modify the objective 1704, the knowledge engineer that created this application specific interface screen 1700 has permitted the application engineer to formulate goals 1709, such as matching power to a desired power curve at 1710, placing a high limit on hydrocarbon output at 1712, and minimizing fuel consumption at 1714. The creating knowledge engineer has also permitted the application engineer to formulate certain aspects of the test procedure 1716 to be used so that the application engineer can specify such things as the fuel to be utilized in the simulation at 1718, the engine speeds at which to perform the simulation at 1720, and the ratio of the throttle area that is open at 1722. By preventing the application engineer from altering the strategy 1706 and engine 1708, the knowledge engineer, however, prevents the application engineer from tampering with aspects of engine design that might be better dealt with by a more knowledgeable knowledge engineer.

It should be noted that the application engineer may and probably should change the description associated with the objective 1724 and the description associated with the automated engine design 1726 if any changes are made to the objective parameters so that each design variation is uniquely identified.

The expert system may also include management interface functions that permit management to view the status of operations occurring in the expert system and permit management to control the priority of the execution of those operations.

Like human resources, computer systems are typically a finite resource so that a limited number of operations can be performed by the computer system at a given time. More so than humans, however, computer system resources can be redirected from one or more activities to one or more other activities quickly with little or no loss of efficiency. That is one way the expert system provides greater flexibility to management than a group of human experts might.

A status monitor (not shown) may be provided to management personnel and others that displays the status of one or more operations that the expert system is currently processing. The status monitor may indicate, for example, the goal, the progress of the expert system in reaching the goal, and the amount of processing that is required to complete the processing of each operation being performed. Review of the status of an optimization may be viewed by simply selecting an optimization to view and refreshing the status of that optimization, for example.

The goal of a particular operation may, for example, be to optimize an engine design to match a desired power curve over a range of engine speeds by modifying engine and related component characteristics. For such an operation, the status monitor may display graphically the desired power curve and plot on the same graph a power curve for the engine design used as a starting point and the best engine design created thus far. The status monitor may furthermore include an estimate of the number of engines simulated and the number of engines yet to be simulated in that optimization. The status monitor may also display the desired completion time for each optimization or a priority hierarchy for each optimization being performed.

The information displayed may be used by a manager or other to make decisions regarding how system operation should take place going forward in time. For example, the manager may place one optimization on hold to allow another optimization to be completed more quickly. The manager or other user may also terminate an optimization if, for example, the goal has been approximated to an acceptable level and no further optimization is desired, or if an optimization is performing so poorly that it should be revised and then re-executed. The manager or other user may also modify the priorities of optimization runs to meet desired schedules.

The expert system may modify optimization priorities dynamically to meet desired completion times for each optimization running. The expert system may also perform other automatic functions. For example, when many characteristics are selected to be varied during an optimization run, an optimization system may not perform efficiently because the compounded number of variations may overwhelm the optimization hardware available to perform the operation or the time to perform the optimization may be onerously long. The expert system may, therefore, optimize those characteristics in subsets or groups of characteristics with one or more best solutions feeding into a second or greater round of optimization. That process may also be cyclical with results from later rounds of optimization being utilized as starting designs for earlier performed groups of characteristics.

Another example of an automatic function that the expert system may perform to improve resulting designs is to check the sensitivity of each variable varying in the optimization and reevaluate variables exhibiting a high degree of sensitivity. Sensitivity is related to the degree to which a design changes when a small variation of a variable, such as one tolerance value, is implemented. A large change in the result from a small change in the value of the variable indicates a high sensitivity and may indicate that the optimum result could be improved upon. Thus, the expert system may set a reduced tolerance for the variable or variables showing a high sensitivity and rerun the optimization for those variables utilizing the resulting design as a base design.

Yet another function that may be utilized when optimizations are being performed on multiple machines is a selection function whereby machines having greater capacities and/or lesser loads may be automatically selected to provide the most efficient utilization for high priority runs or for meeting a deadline.

In addition, the expert system may be operated numerous times sequentially or simultaneously to reach a desired result. For example, multiple optimizations may be run using different strategies to find a best solution. In another example, many variables may be desired and multiple operations of the expert system may be run sequentially for groups of those variables with each sequential run suing one or more best solutions from the previous run.

It should be noted that terms including knowledge engineer, application engineer and manager are intended to apply to functions performed by humans and the expert system is described in functional sections corresponding to those human functions. It is acknowledged, however, that any one person may perform more than one of those functions and so have access to multiple functional aspects of the expert system.

In an embodiment of the expert system, a structure is contemplated that organizes the workings of the expert system for utilization users of various levels and for management oversight of the operation of the expert system. That structure is underpinned by organizing information in a knowledgebase.

A variety of project subknowledgebases are included in the knowledgebase. Each project may be structured to include all knowledge needed or thought to be needed to create a desired design or process. Projects may be further subdivided into subprojects also containing knowledge thought to be needed to create a desired design or process. Access to those projects and subprojects may then be limited to limit the knowledge to which a user, such as a novice user, has access. Thus, in the example of an expert system that is to design engines, each project and subproject may contain at least one base engine definition, at least one test procedure, at least one objective, and at least one strategy. During simulation or after designs are simulated, for example to optimize a base engine to meet desired objectives, resulting engine definitions, which are referred to as automated engine designs herein, are created and are also stored in the knowledgebase for the applicable project. In a typical application, a knowledge engineer may place the appropriate information (i.e., base engine definitions, test procedures, objectives, and strategies) in the project and an application engineer may utilize that information in various combinations to achieve the desired objectives. Other variations are also contemplated wherein, for example, no objectives are provided by the knowledge engineer and the application engineer is permitted to create objectives based, for example, on marketing needs without input from the knowledge engineer. In that way, the best design information is made available by the knowledge engineer and that information may be combined with marketing needs by an application engineer to create one or more optimized designs or processes.

Subprojects may also be beneficial where subdivision of information within a project is desired, for example, to structure the knowlegebase that is contained within the project or to further control access to the knowledgebase contained within the project. Subprojects may be viewed as nested projects.

Information that is created to be included in projects may also be organized in non-project subknowledgebases. For example, in an embodiment, a strategy subknowledgebase is contained within the knowledgebase. That strategy subknowledgebase contains a variety of subdirectories to organize strategies. Strategy subdirectories might include a provider subdirectory for strategies developed by the expert system provider, an unassigned subdirectory for strategies provided by other sources outside the user organization, separate subdirectories for each knowledge engineer in the organization, an approved subdirectory and a trashbin subdirectory. When a knowledge engineer determines that a strategy that he created and stored in his subdirectory is not useful, that knowledge engineer may move that strategy to the trashbin. A manager may then review the strategies in the trashbin and delete those strategies that the manager determines are not to be used again. The manager may also move or copy strategies from any subdirectory that have been proven to be beneficial to the approved subdirectory. That organization of strategies creates a framework that provides a manager with the ability to supervise development of the strategies portion of the knowledgebase.

Organization of information outside of the projects is beneficial when, for example, that information may be applied to multiple projects. Certain information may not be applicable to multiple projects and so may be maintained only in the applicable project, while other information, like certain strategies, may be applicable to multiple projects. Information that may be applicable to multiple projects may be organized outside of the projects subdirectories in, for example, a strategies subknowledgebase for strategies with potential for more than one use. Strategies and other information organized outside of the projects may then be copied into all appropriate project files or otherwise related to the appropriate projects. Organization of various forms of information outside the projects, other than strategies for example, may also be implemented.

In an embodiment wherein engines are being designed by the expert system, a structure called an automated engine design ("AED") may be implemented. Each AED contains a subset of information from the knowledgebase that may be referred to as a subknowledgebase. That information may be used to perform optimizations or sets of simulations intended to find an optimum engine design. One or more users may place certain information in an AED including one or more base design definitions, one or more objectives that define what is to be optimized, and one or more strategies that define how the optimization is to be performed. Those base engine definitions, objectives, and strategies may be stored in files entitled "Engines," "Objectives," and "Strategies" respectively, that are associated with that AED in this embodiment. When an AED is created, those "Engines," "Objectives," and "Strategies" files may be empty. Appropriate information may then be added to those files by appropriate people. For example, base engines definitions on which optimizations are to be run may be added by a knowledge engineer, proven strategies for various optimizations having to do with that type of engine may be added by a knowledge engineer, and objectives may be added by an application engineer. Alternately, pointers to those base engine definitions, objectives, and strategies may be created in the AED where those base engine definitions, objectives, and strategies are stored elsewhere in the knowledgebase.

Once appropriate information has been added to the AED, the application engineer may select an appropriate base engine definition, select one or more desired objectives, and select one or more strategies that are appropriate for making modifications to the base engine definition to create an engine that optimizes those objectives. The selected information may then be optimized by creating and simulating a plurality of engine designs from the selected base engine definitions, objectives and strategies.

During a simulation, resulting engine designs are generally created and the best resulting engine designs are saved. After an optimization has been performed, the base engine design, objectives and strategies that were utilized in that simulation, along with the saved resulting designs may be saved in a subdirectory within the AED. In that way, managers and engineers have a history that tells them how a resulting engine design was created. That information may then be utilized for many purposes including deciding which strategies provide the best results and should be moved into the "Approved" directory.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. An expert system, comprising:
   a data storage device, in which is stored a knowledgebase having a database structure that includes:
      a plurality of models, each defining one of a device and a process, each model including a plurality of attributes including a variable attribute, the attributes corresponding to attributes of one of the device and the process defined by the model;

a plurality of objectives, each objective including an objective rule for evaluating a characteristic of at least one of the models;

a plurality of strategies, each strategy including a strategic rule for modifying the variable attribute of at least one of the models; and a sub-knowledgebase including an identification of at least one of the models, an identification of at least one of the objectives, and an identification of at least one of the strategies; and a processor coupled to the data storage device, the processor executing instructions which, cause the processor to:

evaluate a selected model identified in the sub-knowledgebase in accordance with a selected objective identified in the sub-knowledgebase, the variable attribute of the model being set in accordance with a selected strategy identified in the sub-knowledgebase to determine a characteristic value associated with the selected model and the variable attribute setting;

determine, using the objective rule, whether the characteristic value is an improvement over a previous characteristic value; and store a result in the storage device so as to be accessible to a user when the characteristic value is an improvement over the previous characteristic value, the result including an identification of the selected model and the variable attribute setting used to determine the improved characteristic value for one of the device and the process defined by the model.

2. The expert system of claim 1, wherein the result is stored in association with the selected model.

3. The expert system of claim 1, wherein the result is stored with a pointer identifying the selected model.

4. The expert system of claim 1, wherein at least two models are identified in the sub-knowledgebase and the instructions cause the processor to evaluate more than one model identified in the sub-knowledgebase.

5. The expert system of claim 1, wherein the instructions cause the processor to create a new model having the plurality of attributes of the selected model and a variable attribute value determined using the strategy.

6. The expert system of claim 1, wherein the objective rule includes a goal.

7. The expert system of claim 1, wherein each strategy further includes an identification of the variable attribute to which the strategic rule applies.

8. The expert system of claim 1, wherein the selected model includes a plurality of variable attributes and the selected strategy includes a strategic rule for each of at least a subset of the plurality of variable attributes.

9. The expert system of claim 8, wherein the selected strategy further includes an identification of the variable attributes to which the strategic rules apply.

10. The expert system of claim 1, wherein the strategic rule defines how the variable attribute is to be varied.

11. The expert system of claim 1, wherein the strategic rule includes a range of values for the variable attribute.

12. The expert system of claim 1, wherein at least two strategies are identified in the sub-knowledgebase and the instructions cause the processor to evaluate the selected model in accordance with more than one strategy identified in the sub-knowledgebase.

13. The expert system of claim 1, further comprising an input device coupled to the processor, the input device to accept instructions from a user.

14. The expert system of claim 13, wherein the processor receives instructions from the input device which further cause the processor to modify the selected model.

15. The expert system of claim 13, wherein the processor receives instructions from the input device which further cause the processor to modify the selected objective.

16. The expert system of claim 1, wherein the selected objective is stored in the storage device if the characteristic value is an improvement over a previous characteristic value.

17. The expert system of claim 13, wherein the processor receives instructions from the input device which further cause the processor to modify the selected strategy.

18. The expert system of claim 1, wherein the selected strategy is stored in the storage device if the characteristic value is an improvement over a previous characteristic value.

19. The expert system of claim 13, wherein the processor receives instructions from the input device which further cause the processor to perform one or more of: create a new model, retrieve one of the models from the knowledgebase, retrieve and edit one of the models from the knowledgebase, store a new model in the knowledgebase, create a new objective, retrieve one of the objectives from the knowledgebase, retrieve and edit one of the objectives from the knowledgebase, store a new objective in the knowledgebase, create a new strategy, retrieve one of the strategies from the knowledgebase, retrieve and edit one of the strategies from the knowledgebase, and store a new strategy in the knowledgebase.

20. The expert system of claim 1 further comprising an output device coupled to the processor, wherein the processor further includes instructions that cause the output device to display the selected strategy to the user, display the selected objective to the user, display the selected model to the user, display the characteristic value to the user, and display the result to the user.

21. The expert system of claim 1, wherein the evaluation includes simulating the operation of a device.

22. The expert system of claim 1, wherein the evaluation includes simulating a process.

23. The expert system of claim 1, wherein the evaluation includes solving a problem.

24. The expert system of claim 1, wherein the evaluation includes solving an equation.

25. The expert system of claim 1, wherein the instructions further cause the processor to evaluate the model repeatedly using a plurality of different values for the variable attribute in accordance with the strategic rule.

26. The expert system of claim 1, wherein the instructions further cause the processor to:

evaluate the selected model with the variable attribute set to a base value to determine a base characteristic value;

generate a plurality of different values for the variable attribute; and evaluate the selected model with the variable attribute set to each of the plurality of different values to determine a characteristic value associated with the model and each variable attribute setting.

27. The expert system of claim 1, wherein the instructions further cause the processor to rank the characteristic value, using the objective rule, in relation to a previous value determined for the characteristic.

28. The expert system of claim 1, wherein the instructions further cause the processor to store the selected model with the variable attribute setting in the sub-knowledgebase when the characteristic value is an improvement over the previous characteristic value.

29. The expert system of claim 1, wherein the instructions further cause the processor to store the variable attribute setting used to determine the improved characteristic value with a pointer to a previously stored model used in the evaluation that resulted in the improved characteristic value.

30. The expert system of claim 1, wherein the instructions further cause the processor to store the improved characteristic value in the sub-knowledgebase.

31. An expert system, comprising:
a data storage device, in which is stored:
a plurality of models, each defining one of a device and a process, each model including a plurality of attributes including a variable attribute, the attributes corresponding to attributes of one of the device and the process defined by the model;
a plurality of objectives, each objective including an objective rule for evaluating a characteristic of at least one of the models; and
a plurality of strategies, each strategy including a strategic rule for modifying the variable attribute; and
a processor coupled to the data storage device, the processor executing instructions which, cause the processor to:
create a new strategy;
evaluate a selected model stored in the data storage device in accordance with a selected objective stored in the data storage device and having the variable attribute set in accordance with at least one of the new strategy and one of the strategies stored in the data storage device to determine a characteristic value associated with the selected model and the variable attribute setting;
store an identification of the new strategy used in the evaluation in the data storage device;
determine, using the objective rule, whether the characteristic value is an improvement over a previous characteristic value; and
store a result in the storage device when the characteristic value is an improvement over the previous characteristic value, the result including an identification of the selected model and the variable attribute setting used to determine the improved characteristic value for one of the device and the process defined by the model.

32. The expert system of claim 31, wherein the instructions further cause the processor to store an identification of a user who created the new strategy with the new strategy.

33. The expert system of claim 32, wherein the instructions further cause the processor to prevent the user who created the new strategy from removing the new strategy from the data storage device.

34. The expert system of claim 31, wherein the instructions further cause the processor to store an identification of one of the plurality of strategies from which the new strategy was created with the new strategy.

35. The expert system of claim 1, wherein the device includes an internal combustion engine.

36. The expert system of claim 1, wherein the selected model, the selected objective, and the selected strategy are selected by a user.

37. The expert system of claim 1, wherein the selected model, the selected objective, and the selected strategy are selected by the processor.

* * * * *